United States Patent
Hong et al.

(10) Patent No.: US 12,461,244 B2
(45) Date of Patent: Nov. 4, 2025

(54) MICRO-PULSE LIDAR AND METHOD FOR DETECTING WATER VAPOR, TEMPERATURE, AND PRESSURE OF ATMOSPHERE

(71) Applicant: GUANGDONG RUIZHI ERA NEW ENERGY Co., Ltd, Shenzhen (CN)

(72) Inventors: Guanglie Hong, Shanghai (CN); Jianyu Wang, Shanghai (CN)

(73) Assignee: GUANGDONG RUIZHI ERA NEW ENERGY Co., Ltd, Shenzhen (CN)

( * ) Notice: Subject to any disclaimer, the term of this patent is extended or adjusted under 35 U.S.C. 154(b) by 885 days.

(21) Appl. No.: 17/577,129

(22) Filed: Jan. 17, 2022

(65) Prior Publication Data
US 2023/0058292 A1 Feb. 23, 2023

(30) Foreign Application Priority Data
Aug. 19, 2021 (CN) .......................... 202110955484.5

(51) Int. Cl.
*G01S 17/95* (2006.01)
*G01S 7/481* (2006.01)
(Continued)

(52) U.S. Cl.
CPC ............ *G01S 17/95* (2013.01); *G01S 7/4815* (2013.01); *G02B 27/141* (2013.01); *G02B 27/283* (2013.01)

(58) Field of Classification Search
CPC ...... G01S 17/95; G01S 7/4815; G01S 7/4812; G01S 7/4816; G01S 7/4818; G01S 7/484;
(Continued)

(56) References Cited

U.S. PATENT DOCUMENTS 7,414,706 B2 * 8/2008 Nichols ................. G01S 13/865
356/28
8,797,550 B2 * 8/2014 Hays ......................... G01J 9/04
356/519
(Continued)

FOREIGN PATENT DOCUMENTS

CN 101004453 A * 7/2007 ............. Y02A 90/10
CN 112285741 A * 1/2021 ............. G01S 17/95
(Continued)

*Primary Examiner* — Mohamed K Amara
(74) *Attorney, Agent, or Firm* — BEKIARES ELIEZER LLP

(57) ABSTRACT

A micro-pulse LiDAR and a method for detecting water vapor, temperature, and pressure of the atmosphere are provided. The micro-pulse LiDAR includes a first transmitter, a second transmitter, a third transmitter, an optical path transmission module, a water vapor channel detection module, a pressure channel detection module, a temperature channel detection module, a multi-channel data accumulator, a processing device, and a pulse generator. The method for detecting the water vapor, the temperature, and the pressure of the atmosphere comprises: chopping, via the processing device, multi-wavelength continuous lasers emitted by the transmitters to obtain multi-wavelength pulsed lasers; transmitting the multi-wavelength pulsed lasers according to established optical paths, and comprehensively detecting the water vapor, the temperature, and the pressure of the atmosphere, so that the three parameters can be input conditions for each other in an inversion process, which improves an iteration speed and inversion accuracy.

16 Claims, 6 Drawing Sheets

(51) Int. Cl.
*G02B 27/14* (2006.01)
*G02B 27/28* (2006.01)

(58) Field of Classification Search
CPC .......... G01S 7/499; G01S 17/10; G01S 17/34; G01S 17/58; G02B 27/141; G02B 27/283; Y02A 90/10
See application file for complete search history.

(56) References Cited

U.S. PATENT DOCUMENTS

| | | | |
|---|---|---|---|
| 8,810,796 B2* | 8/2014 | Hays | G01S 17/58 |
| | | | 356/519 |
| 9,097,646 B1* | 8/2015 | Campbell | G01S 17/95 |
| 10,948,282 B2* | 3/2021 | Egan | H01S 5/4012 |
| 12,061,287 B2* | 8/2024 | Stillwell | G01S 17/86 |
| 12,202,396 B1* | 1/2025 | Hansson | F21S 41/13 |
| 2013/0314694 A1* | 11/2013 | Tchoryk, Jr. | G01S 17/58 |
| | | | 356/28.5 |
| 2020/0041255 A1* | 2/2020 | Ahmed | G02B 27/1006 |
| 2020/0041256 A1* | 2/2020 | Ahmed | G01B 9/02018 |
| 2020/0041257 A1* | 2/2020 | Egan | H01S 5/4012 |
| 2021/0405207 A1* | 12/2021 | Stillwell | G01S 17/95 |
| 2023/0058292 A1* | 2/2023 | Hong | G01S 7/4812 |
| 2023/0277065 A1* | 9/2023 | Islam | A61B 5/14532 |
| | | | 433/29 |

FOREIGN PATENT DOCUMENTS

| | | | |
|---|---|---|---|
| DE | 60313406 T2 * | 1/2008 | ............ B64D 15/20 |
| JP | 2005077347 A * | 3/2005 | ............ Y02A 90/10 |
| RU | 2405172 C2 * | 11/2010 | ............ G01P 5/26 |

* cited by examiner

MICRO-PULSE LIDAR AND METHOD FOR DETECTING WATER VAPOR, TEMPERATURE, AND PRESSURE OF ATMOSPHERE

CROSS REFERENCE TO RELATED APPLICATION(S)

This patent application claims the benefit and priority of Chinese Patent Application No. 202110955484.5 filed on Aug. 19, 2021, the disclosure of which is incorporated by reference herein in its entirety as part of the present application.

TECHNICAL FIELD

The present disclosure relates to the field of low light level detection in an optical communication industry, and more particularly, to a micro-pulse LiDAR and a method for detecting water vapor, temperature, and pressure of the atmosphere.

BACKGROUND ART

The temperature and the water vapor of the atmosphere are important atmospheric thermodynamic parameters. In terms of space and time distributions, there is still a large demand gap for thermodynamic profile data of the troposphere. In a series of atmospheric processes related to atmospheric dynamics, pressure plays a very important role. Information such as low pressure, high pressure, a low pressure trough, and a high pressure ridge is all introduced into an atmospheric mode. In 1987, some scholars pointed out that a main limitation on accuracy of a weather model was sparseness of a geographical distribution of input atmospheric pressure data. Atmospheric pressure data are also very sparse in large areas of oceans, large inland deserts, Gobi, and even plateau areas. In terms of time, radiosonde balloons can only be released at two fixed times a day. In terms of space, radiosonde observation can only be carried out at fixed meteorological observatories. The development of ground-based, inexpensive, networkable, and widely deployed active remote sensing instruments is a requirement for the development of meteorological services.

At present, a differential absorption LiDAR system is the most potential to fill a gap in profile observation data of tropospheric atmospheric thermodynamics and dynamics. A differential absorption LiDAR can successfully detect a content of the atmospheric tropospheric water vapor. With Alexandrite as a mainstream laser device or a dye laser device pumped by a solid-state laser device as an emitting light source, a photomultiplier tube can still act as a detector in this waveband. A representative system is an airborne LEANDRE II instrument from France. A water vapor differential absorption LiDAR with a waveband of 820 nm, with a Tisapphire laser device or a Tisapphire optical amplifier as a transmitter core, and a silicon avalanche diode as the detector, such as a vehicle scanning LiDAR of the Hohenheim University in Germany, can obtain a 2D or 3D distribution structure of water vapor within 300 m-4 km in the troposphere. An LASE airborne system developed by NASA Langley Research Center with emission energy of 100-150 mJ and a repetition frequency of 5 Hz measures accuracy of a water-to-vapor mixing ratio of up to 6% or 0.01 g/kg. A differential absorption LiDAR of Für Meteorlogie und Klimaforschung Institute in Germany can detect a vertical distribution of atmospheric water vapor between 3 km altitude and 12 km altitude.

Although the differential absorption LiDAR has been successfully applied in a vertical profile detection of the atmospheric water vapor, before this, the differential absorption LiDAR has not been successfully implemented in an atmospheric temperature profile detection. A reason is that an absorption spectrum of a temperature-expressing gas (oxygen) is relatively narrow, so that a width of a Rayleigh backscattering spectrum of a laser can be compared with a width of an absorption spectrum of oxygen. Therefore, a proportion of Rayleigh backscattering to Mie backscattering in atmospheric backscattering is very important for a numerical inversion of a vertical profile of the atmospheric temperature by the differential absorption LiDAR.

Raman LiDAR system based on inelastic backscattering can not only detect atmospheric temperature with rotating Raman technology, but also measure an atmospheric water-to-vapor mixing ratio with vibration Raman technology. A low efficiency of Raman backscattering makes the LiDAR system require higher (transmitting) power×(receiving) aperture. For a 532 nm laser, pulse energy is not less than 300 mJ, pulse repetition frequency is not more than 50 Hz and pulse time width is about 10 ns. A diameter of a main lens of a telescope is not less than 500 mm. Four sets of Raman LiDAR systems worldwide, that is, Caeli LiDAR system of Netherlands Meteorological Institute, RALMO system of Swiss, Raman LiDAR system of an atmospheric radiation measurement project of Germany and DRAMSES LiDAR system, have all shown that Raman LiDAR has a very low signal-to-noise ratio in daytime and frequently requires a radio sounding method for calibration thereof, resulting in high maintenance costs.

The forgoing absorption differential LiDAR and Raman LiDAR transmitters all use a laser device with a low repetition frequency and high pulse energy. High peak power of laser pulses has a risk of damage to human eyes, and also results in a very high volume and a very high power consumption of the laser device, which is one of the reasons for the high costs of the LiDAR. Therefore, LiDAR that can simultaneously detect water vapor, temperature, and pressure of the atmosphere has not yet been widely used.

SUMMARY

An objective of the present disclosure is to provide a micropulse LiDAR and a method for detecting water vapor, temperature, and pressure of an atmosphere, to solve two problems existing in a laser transmitter in the conventional art: a peak power of transmitted pulses is large, and a power consumption is high, which causes a safety risk to human eyes and high costs of establishment and maintenance; and there lacks a composite micropulse LiDAR that can perform inversion calculations for the water vapor, the temperature, and the pressure of the atmosphere at the same time, such that an iteration speed and inversion accuracy need to be improved.

BRIEF DESCRIPTION OF THE DRAWINGS

In order to explain embodiments of the present disclosure or the technical solutions in the prior art more clearly, the following briefly introduces the drawings that need to be used in the embodiments. Obviously, the drawings in the following description are only some of embodiments of the present disclosure. The person skilled in the art can obtain other drawings based on these drawings without creative labor.

DETAILED DESCRIPTION OF THE EMBODIMENTS

Figure 1:
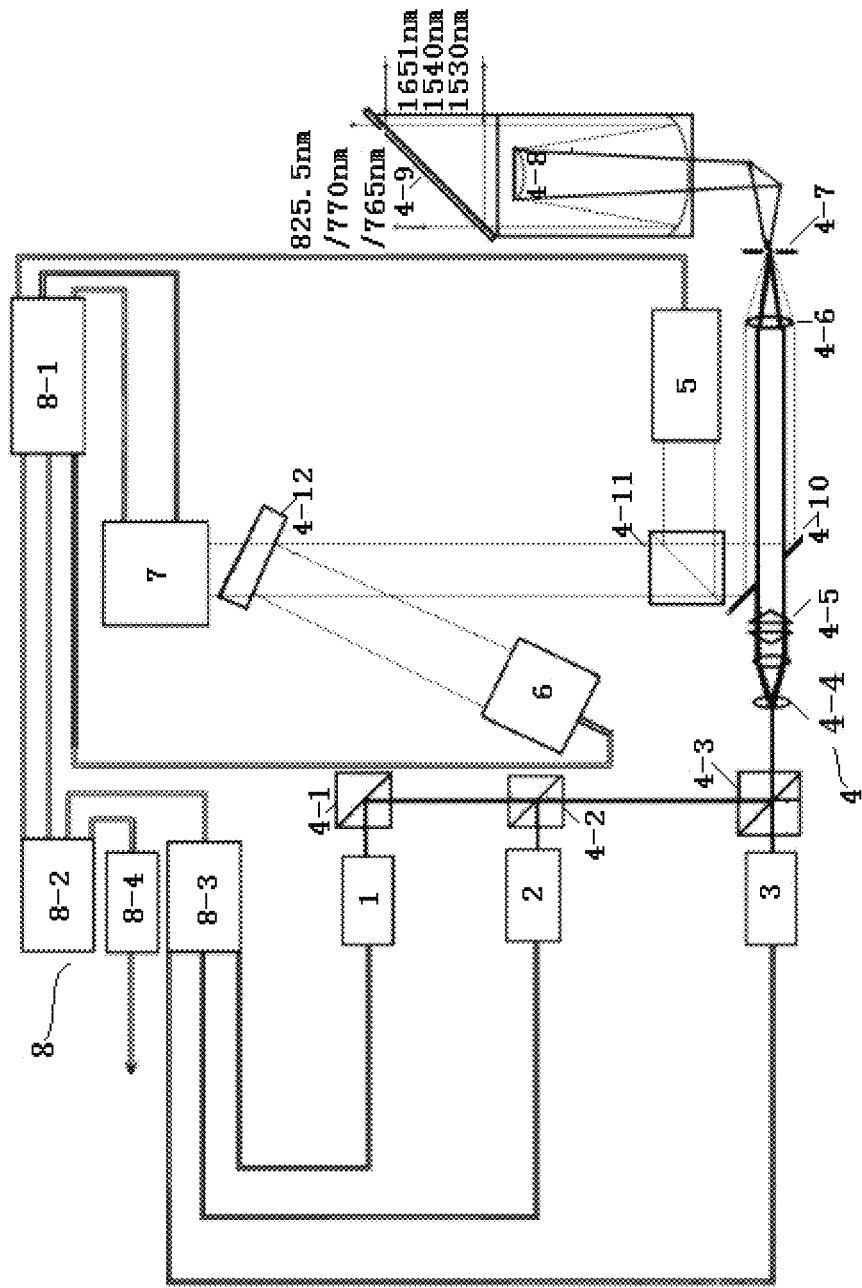
FIG. 1 is a schematic structural diagram of a micro-pulse LiDAR according to the present disclosure.

The following clearly and completely describes the technical solutions in embodiments of the present disclosure in conjunction with the drawings in the embodiments of the present disclosure. Obviously, the described embodiments are only a part of the embodiments of the present disclosure, rather than all embodiments. Based on the embodiments of the present disclosure, all other embodiments obtained by the person skilled in the art without creative labor shall fall within the protection scope of the present disclosure.

An objective of the present disclosure is to provide a micro-pulse LiDAR and a method for detecting water vapor, temperature, and pressure of the atmosphere, to solve two problems existing in a laser transmitter in the conventional art: transmitted pulses have high peak power, and power consumption, which brings about a safety risk to human eyes and high costs of establishment and maintenance; and there is a lack of a composite micro-pulse LiDAR that can perform inversion calculations for the water vapor, the temperature, and the pressure of the atmosphere at the same time, and an iteration speed and inversion accuracy need to be improved.

To achieve the forgoing objective, the present disclosure provides a micro-pulse LiDAR, including: a first transmitter, a second transmitter, and a third transmitter configured to emit different lasers, respectively; an optical path transmission module, arranged on optical transmission paths of lasers of different wavelengths, configured to combine the lasers of the different wavelengths into a beam and guide the beam into the atmosphere, and also configured to receive an excited atmospheric backscattered echo light beam, convert the backscattered echo light beam into a parallel echo light beam, and separate the parallel echo light beam into a water vapor echo light, a pressure echo light and a temperature echo light; a water vapor channel detection module, a pressure channel detection module, and a temperature channel detection module that are arranged on transmission light paths of the water vapor echo light, the pressure echo light, and the temperature echo light, respectively; where, the water vapor channel detection module is configured to receive and detect the number of water vapor photons in the water vapor echo light; the pressure channel detection module is configured to receive and detect the number of pressure photons in the pressure echo light; and the temperature channel detection module is configured to receive and detect the number of first temperature photons and the number of second temperature photons in the temperature echo light; a data processing control module, connected to the first transmitter, the second transmitter, the third transmitter, the water vapor channel detection module, the pressure channel detection module, and the temperature channel detection module, configured to acquire data of the water vapor channel detection module, the pressure channel detection module, and the temperature channel detection module, and unify the data for the inversion calculations, and configured to control injection currents and operating temperatures of the first transmitter, the second transmitter, and the third transmitter, and chop output continuous-wave lasers into pulsed lasers to coordinate timing of a system.

The data processing control module includes: a multi-channel data accumulator, where, an input terminal of the multi-channel data accumulator is connected to the water vapor channel detection module, the pressure channel detection module, and the temperature channel detection module, respectively, and an output terminal of the multi-channel data accumulator is connected to a processing device. The multi-channel data accumulator is configured to transmit the number of the water vapor photons, the number of the pressure photons, the number of the first temperature photons, and the number of the second temperature photons to the processing device for unified inversion calculations.

The processing device is also connected to a pulse generator. The pulse generator is connected to the first transmitter, the second transmitter, and the third transmitter, respectively, and provides the first transmitter, the second transmitter, and the third transmitter with chopped pulses.

The processing device includes at least one processor connected to the first transmitter, the second transmitter, and the third transmitter, and configured to form a servo unit to adjust the injection currents and the operating temperatures of the first transmitter, the second transmitter, and the third transmitter. The processing device is also configured to coordinate timing of the pulse generator and the data accumulator.

The present disclosure also provides a method for detecting water vapor, temperature, and pressure of an atmosphere with a micro-pulse LiDAR, specifically including:

S1: emitting lasers of different wavelengths via a first transmitter, a second transmitter, and a third transmitter, respectively, and combining the lasers of the different wavelengths into a laser beam;

S2: guiding the laser beam to the atmosphere, and acquiring an excited atmospheric backscattered echo light beam;

S3: converting the backscattered echo light beam into a parallel echo light beam, and separate the parallel echo light beam into a water vapor echo light, a pressure echo light, and a temperature echo light;

S4: detecting the water vapor echo light, the pressure echo light, and the temperature echo light respectively to obtain the number of the water vapor photons, the number of the pressure photons, the number of the first temperature photons, and the number of the second temperature photons;

S5: transmitting the number of the water vapor photons, the number of the pressure photons, the number of the first temperature photons, and the number of the second temperature photons to a processing device to perform unified inversion calculations to obtain the water vapor, the temperature, and the pressure of the atmosphere.

According to specific embodiments provided by the present disclosure, the present disclosure discloses the following technical effects: a micro-pulse LiDAR provided by the present disclosure includes a first transmitter, a second transmitter, a third transmitter, an optical path transmission module, a water vapor channel detection module, a pressure channel detection module, a temperature channel detection module, a multi-channel data accumulator, a processing device, and a pulse generator. The present disclosure also provides a method for detecting water vapor, temperature, and pressure of an atmosphere with the micro-pulse LiDAR. The processing device chops multi-wavelength continuous lasers emitted by the transmitters to obtain multi-wavelength pulsed lasers. The multi-wavelength pulsed lasers are transmitted according to established optical paths, and the water vapor, the temperature, and the pressure of the atmosphere are comprehensively detected, so that the three parameters can be input conditions for each other in an inversion process, which improves an iteration speed and inversion accuracy.

In order to make the forgoing objectives, characteristics, and advantages of the present disclosure more obvious and easier to understand, the present disclosure is further described in detail with reference to the drawings and specific embodiments.

Embodiment 1

As shown in FIGS. 1-5, a micro-pulse LiDAR includes: a first transmitter 1, a second transmitter 2, and a third transmitter 3 which are configured to emit lasers of different wavelengths, respectively; an optical path transmission module 4, arranged on optical transmission paths of lasers of different wavelengths, configured to combine the lasers of the different wavelengths into one laser beam and guide the beam into the atmosphere, and also configured to receive an excited atmospheric backscattered echo light beam, convert the backscattered echo light beam into a parallel echo light beam, and separate the parallel echo light beam into a water vapor echo light, a pressure echo light and a temperature echo light to emit respectively; a water vapor channel detection module 5, a pressure channel detection module 6, and a temperature channel detection module 7 that are arranged on transmission light paths of the water vapor echo light, the pressure echo light, and the temperature echo light, respectively; where, the water vapor channel detection module 5 is configured to receive and detect the number of the water vapor photons in the water vapor echo light; the pressure channel detection module 6 is configured to receive and detect the number of the pressure photons in the pressure echo light; and the temperature channel detection module 7 is configured to receive and detect the number of the first temperature photons and the number of the second temperature photons in the temperature echo light; and a data processing control module 8, connected to the first transmitter 1, the second transmitter 2, the third transmitter 3, the water vapor channel detection module 5, the pressure channel detection module 6, and the temperature channel detection module 7, configured to acquire data of the water vapor channel detection module 5, the pressure channel detection module 6, and the temperature channel detection module 7, and unify the data for the inversion calculations, and configured to control injection currents and operating temperatures of the first transmitter 1, the second transmitter 2, and the third transmitter 3, and chop continuous lasers output by the first transmitter 1, the second transmitter 2, and the third transmitter 3 into pulsed lasers.

The data processing control module includes a multi-channel data accumulator 8-1, where, an input terminal of the multi-channel data accumulator 8-1 is connected to the water vapor channel detection module 5, the pressure channel detection module 6, and the temperature channel detection module 7, respectively, and an output terminal of the multi-channel data accumulator is connected to a processing device 8-2. The multi-channel data accumulator 8-1 is configured to transmit the number of the water vapor photons, the number of the pressure photons, the number of the first temperature photons, and the number of the second temperature photons to the processing device for unified inversion calculations.

The processing device 8-2 is also connected to a pulse generator 8-3. The pulse generator 8-3 is connected to the first transmitter 1, the second transmitter 2, and the third transmitter 3, respectively, and provides the first transmitter 1, the second transmitter 2, and the third transmitter 3 with chopped pulses.

The processing device 8-2 includes at least one processor connected to the first transmitter 1, the second transmitter 2, and the third transmitter 3 to form a servo unit, and configured to adjust the injection current and the operating temperature of the first transmitter 1, the second transmitter 2, and the third transmitter 3.

In specific applications, the first transmitter 1 emits a laser with a wavelength of 765 nm. The second transmitter 2 emits a laser with a wavelength of 770 nm. The third transmitter 3 emits a laser with a wavelength of 825.5 nm.

The first transmitter 1 includes a 1530.3324 nm detection laser seed source 1-1, a 1530.7608 nm reference laser seed source 1-2, a first 1×1 switch 1-3, a second 1×1 switch 1-4, a first 2×1 switch 1-5, a first acousto-optic modulator 1-7, a first erbium-doped fiber amplifier 1-9, and a first frequency doubler 1-11 connected in sequence. The first acousto-optic modulator 1-7 is connected to a first radio frequency oscillator 1-8. The first radio frequency oscillator 1-8 is connected to the pulse generator 8-3. The first erbium-doped fiber amplifier 1-9 is also connected to a first continuous pump source 1-10.

The 1530.3324 nm detection laser seed source 1-1 includes a first DFB semiconductor continuous wave wavelength reference hydrogen cyanide unit 1-1-1 and a first DFB semiconductor continuous wave detection wavelength stabilization unit 1-1-2. The 1530.7608 nm reference laser seed source 1-2 includes a second DFB semiconductor continuous wave wavelength reference hydrogen cyanide unit 1-2-1 and a first DFB semiconductor continuous wave reference wavelength stabilization unit 1-2-2.

The first DFB semiconductor continuous wave wavelength reference hydrogen cyanide unit 1-1-1 includes: a first distributing feedback laser diode 1-1-1-1, configured to emit continuous laser; a first coupler 1-1-1-2, connected to the first distributing feedback laser diode 1-1-1-1, and configured to divide the continuous laser output by the first distributing feedback laser diode 1-1-1-1 into two portions; a first electro-optical phase modulator 1-1-1-3, connected to the first coupler 1-1-1, and configured to perform phase modulation for laser transmitted by the first coupler 1-1-1-2; a first hydrogen cyanide gas absorption cell 1-1-1-4, connected to the first electro-optical phase modulator 1-1-1-3, and configured to make a phase-adjusted laser intensity to receive a linear absorption of hydrogen cyanide gas molecules R20; a first InGaAs-PIN detector 1-1-1-5, connected to the first hydrogen cyanide gas absorption cell 1-1-1-4, and configured to detect modulated laser passing through the first hydrogen cyanide gas absorption cell 1-1-1-4; a first transimpedance amplifier 1-1-1-6, connected to the first InGaAs-PIN detector 1-1-1-5, and configured to amplify a radio frequency signal output by the first InGaAs-PIN detector 1-1-1-5; a first power divider 1-1-1-14, connected to a first modulated radio frequency generator 1-1-1-13, and configured to transmit a modulated signal generated by the first modulated radio frequency generator 1-1-1-13 to the first electro-optical phase modulator 1-1-1-3 and a first phase shifter 1-1-1-15, respectively; a first mixer 1-1-1-7, connected to the first transimpedance amplifier 1-1-1-6 and the first phase shifter 1-1-1-15, respectively, and configured to mix a radio frequency signal output by the first transimpedance amplifier 1-1-1-6 with a modulated signal output by the first phase shifter 1-1-1-15; a first low-pass filter 1-1-1-8, connected to the first mixer 1-1-1-7, and configured to perform low-pass filtering on a mixed signal, and output an analog signal of a feedback loop; a first analog-to-digital converter 1-1-1-9, connected to the first low-pass filter 1-1-1-8 to convert the analog signal into a digital signal; the processor 1-1-1-10, connected to the first analog-to-digital converter 1-1-1-9, and configured to process the digital signal to obtain an error digital signal by calculation; a first digital-to-analog converter 1-1-1-11, connected to the processor 1-1-1-10, and configured to convert the error digital signal into a corresponding error analog signal; where, the first analog-to-digital converter 1-1-1-9, the processor 1-1-1-10, and the first digital-to-analog converter 1-1-1-11 form a servo unit to play a part of functions of the processing device 8-2; and a first current driver and temperature controller 1-1-1-12, connected to the first digital-to-analog converter 1-1-1-11, and configured to output a current increment and a temperature increment according to the error analog signal.

The first current driver and temperature controller 1-1-1-12 are also connected to the first distributing feedback laser diode 1-1-1-1 and configured to control an injection current and an operating temperature of the first distributing feedback laser diode 1-1-1-1.

Finally, an operating wavelength of the first distributing feedback laser diode 1-1-1-1 is locked to a center wavelength of a hydrogen cyanide gas molecular absorption line R20.

The first DFB semiconductor continuous wave detection wavelength stabilization unit 1-1-2 includes: a second distributing feedback laser diode 1-1-2-1, configured to emit continuous wave laser; a second coupler 1-1-2-2, connected to a second distributing feedback laser diode 1-1-2-1, the first 1×1 switch 1-3, and a third coupler 1-1-2-3, and configured to transmit laser output by the second distributing feedback laser diode 1-1-2-1 to the first 1×1 switch 1-3 and the third coupler 1-1-2-3, respectively; the third coupler 1-1-2-3, also connected to the first coupler 1-1-1-2, and configured to receive a part of the laser of the first distributing feedback laser diode 1-1-1-1 transmitted by the first coupler 1-1-1-2; a first photodetector assembly 1-1-2-4, connected to the third coupler 1-1-2-3, and configured to perform heterodyne detection for a radio frequency signal of a difference frequency between two lasers of the third coupler 1-1-2-3; a first limiting amplifier 1-1-2-5, connected to the first photodetector assembly 1-1-2-4, and configured to limit and amplify a radio frequency signal thereof; a first frequency divider 1-1-2-6, connected to the first limiting amplifier 1-1-2-5, and configured to divide a frequency of the limited and amplified radio frequency signal by 32 times; a first reference clock signal generator 1-1-2-7, configured to generate a clock signal; a first direct digital frequency synthesizer 1-1-2-8, connected to the first reference clock signal generator 1-1-2-7, and configured to generate a reference radio frequency signal of 103.04 MHz under a coordination of the clock signal; a first phase-sensitive detector 1-1-2-9, connected to the first direct digital frequency synthesizer 1-1-2-8 and the first frequency divider 1-1-2-6, and configured to identify a phase difference analog signal between the reference radio frequency signal and the radio frequency signal obtained after a frequency division of 32 times; a second analog-to-digital converter 1-1-2-10, connected to the first phase sensitive detector 1-1-2-9, and configured to convert the phase difference analog signal into a phase difference digital signal; the processor 1-1-2-11, connected to the second analog-to-digital converter 1-1-2-10, and configured to process the phase difference digital signal to obtain an error digital signal; and the second digital-to-analog converter 1-1-2-12, connected to the processor 1-1-2-11, and configured to convert the error digital signal into a corresponding error analog signal; where the second analog-to-digital converter 1-1-2-10, the processor 1-1-2-11, and the second digital-to-analog converter 1-1-2-12 form a servo unit to play a part of functions of the processing device 8-2; and a second current driver and temperature controller 1-1-2-13, connected to the second digital-to-analog converter, and configured to output a current increment and a temperature increment according to the error analog signal.

The second current driver and temperature controller 1-1-2-13 are, also connected to the second distributing feedback laser diode 1-1-2-1, and configured to control an injection current and an operating temperature of the second distributing feedback laser diode 1-1-2-1, such that an operating wavelength of the second distributing feedback laser diode 1-1-2-1 is always 25.7 pm longer than an operating wavelength of the first distributing feedback laser diode 1-1-1-1; Finally, the operating wavelength of the second distributing feedback laser diode 1-1-2-1 is locked at 1530.3324 nm.

The second DFB semiconductor continuous wave wavelength reference hydrogen cyanide unit 1-2-1 includes: a third distributing feedback laser diode 1-2-1-1, configured to emit continuous wave laser; a fourth coupler 1-2-1-2, connected to the third distributing feedback laser diode 1-2-1-1, and configured to divide the continuous laser output by the third distributing feedback laser diode 1-2-1-1 into two portions; a second electro-optical phase modulator 1-2-1-3, connected to the fourth coupler 1-2-1-2, and configured to perform phase modulation of laser transmitted by the second coupler 1-2-1-2; a second hydrogen cyanide gas absorption cell 1-2-1-4, connected to the second electro-optical phase modulator 1-2-1-3, and configured to make an intensity of the phase-modulated laser receive a linear absorption of hydrogen cyanide gas molecules R19; a second InGaAs-PIN detector 1-2-1-5, connected to the second hydrogen cyanide gas absorption cell 1-2-1-4, and configured to detect laser passing through the second hydrogen cyanide gas absorption cell 1-2-1-4; a second transimpedance amplifier 1-2-1-6, connected to the second InGaAs-PIN detector 1-2-1-5, and configured to amplify a radio frequency signal output by the second InGaAs-PIN detector 1-2-1-5; a second modulated radio frequency generator 1-2-1-13, configured to generate a modulated signal; a second power divider 1-2-1-14, connected to the second modulation radio frequency generator 1-2-1-13, the second electro-optical phase modulator 1-2-1-3, and a second phase shifter 1-2-1-15, configured to transmit a modulated signal generated by the second modulation radio frequency generator 1-2-1-13 to the second electro-optic phase modulator 1-2-1-3 and the second phase shifter 1-2-1-15, respectively; a second mixer 1-2-1-7, connected to the second transimpedance amplifier 1-2-1-6 and the second phase shifter 1-2-1-15, and configured to mix a radio frequency signal of the second transimpedance amplifier 1-2-

1-6 with a modulated signal of the second phase shifter 1-2-1-15; a second low-pass filter 1-2-1-8, connected to the second mixer 1-2-1-7, and configured to filter a mixed variable frequency signal and output an analog signal of the feedback loop; a third analog-to-digital converter 1-2-1-9, connected to the second low-pass filter 1-2-1-8, and configured to convert the analog signal into a digital signal; a processor 1-2-1-10, connected to the third analog-to-digital converter 1-2-1-9 and configured to process and the digital signal to obtain an error digital signal by calculation; a third digital-to-analog converter 1-2-1-11, connected to the processor 1-2-1-10, and configured to convert the error digital signal into a corresponding error analog signal; where the third analog-to-digital converter 1-2-1-9, the processor 1-2-1-10, and the third digital-to-analog converter 1-2-1-11 form a servo unit to play a part of functions of the processing device 8-2; and a third current driver and temperature controller 1-2-1-12, connected to the third digital-to-analog converter 1-2-1-11, and configured to output a current increment and a temperature increment according to the error analog signal.

The third current driver and temperature controller 1-2-1-12 are also connected to the third distributing feedback laser diode 1-2-1-1 and configured to control the injection current and operating temperature of the third distributing feedback laser diode 1-2-1-1.

Finally, an operating wavelength of the third distributing feedback laser diode 1-2-1-1 is locked at a center wavelength of a hydrogen cyanide gas molecular absorption line R19.

The first DFB semiconductor continuous wave reference wavelength stabilization unit 1-2-2 includes: a fourth distributing feedback laser diode 1-2-2-1, configured to emit continuous wave laser; a fifth coupler 1-2-2-2, connected to the fourth distributing feedback laser diode 1-2-2-1, the second 1×1 switch 1-4, and a sixth coupler 1-2-2-3, and configured to transmit the laser output by the fourth distributing feedback laser diode 1-2-2-1 to the second 1×1 switch 1-4 and the sixth coupler 1-2-2-3, respectively; the sixth coupler 1-2-2-3, also connected to the fourth coupler 1-2-1-2, and configured to receive a part of laser of the third distributing feedback laser diode 1-2-1-1 transmitted by the fourth coupler 1-2-1-2; a second photodetector assembly 1-2-2-4, connected to the sixth coupler 1-2-2-3, and configured to perform heterodyne detection of a radio frequency signal of a difference frequency between two lasers of the sixth coupler 1-2-2-3; a second limiting amplifier 1-2-2-5, connected to the second photodetector assembly 1-2-2-4, and configured to limit and amplify a radio frequency signal thereof; a second frequency divider 1-2-2-6, connected to the second limiting amplifier 1-2-2-5, and configured to divide a frequency of the limited and amplified radio frequency signal by 32 times; a second reference clock signal generator 1-2-2-7, configured to generate the clock signal; a second direct digital frequency synthesizer 1-2-2-8, connected to the second reference clock signal generator 1-2-2-7, and configured to generate a 101.2 MHz reference radio frequency signal under a coordination of the clock signal; a second phase-sensitive detector 1-2-2-9, connected to the second direct digital frequency synthesizer 1-2-2-8 and the second frequency divider 1-2-2-6, and configured to identify a phase difference analog signal between the reference radio frequency signal and the radio frequency signal obtained after the frequency division of 32 times; a fourth analog-to-digital converter 1-2-2-10, connected to the second phase-sensitive detector 1-2-2-9, and configured to convert the phase difference analog signal into a phase difference digital signal; and a processor 1-2-2-11, connected to the fourth analog-to-digital converter 1-2-2-10, and configured to process the phase difference digital signal to obtain an error digital signal by calculation; a fourth digital-to-analog converter 1-2-2-12, connected to the processor 1-2-2-11, and configured to convert the error digital signal into a corresponding error analog signal; where the fourth analog-to-digital converter 1-2-2-10, the processor 1-2-2-11, and the fourth digital-to-analog converter 1-2-2-12 form a servo unit to play a part of functions of the processing device 8-2; and a fourth current driver and temperature controller 1-2-2-13, connected to the fourth digital-to-analog converter and configured to output a current increment and a temperature increment according to the error analog signal.

The fourth current driver and temperature controller 1-2-2-13 are also connected to the fourth distributing feedback laser diode 1-2-2-1 and configured to control an injection current and an operating temperature of the fourth distributing feedback laser diode 1-2-2-1, such that an operating wavelength of the fourth distributing feedback laser diode 1-2-2-1 is always 25.4 pm shorter than an operating wavelength of the third distributing feedback laser diode 1-2-1-1.

Finally, the operating wavelength of the fourth distributing feedback laser diode 1-2-2-1 is locked at 1530.7608 nm.

The second transmitter 2 includes a 1539.5916 nm detection laser seed source 2-1, a 1540.2170 nm reference laser seed source 2-2, a third 1×1 switch 2-3, a fourth 1×1 switch 2-4, a second 2×1 switch 2-5, a second acousto-optic modulator 2-7, a second erbium-doped fiber amplifier 2-9, and a second frequency doubler 2-11. The second acousto-optic modulator 2-7 is connected to a second radio frequency oscillator 2-8. The second radio frequency oscillator 2-8 is connected to the pulse generator 8-3. A second continuous pump source 2-10 is connected to the second erbium-doped fiber amplifier 2-9.

The 1539.5916 nm detection laser seed source 2-1 includes a DFB semiconductor continuous wave wavelength reference acetylene unit 2-1-1 and a second DFB semiconductor continuous wave detection wavelength stabilization unit 2-1-2. The 1540.2170 nm reference laser seed source 2-2 includes a second DFB semiconductor continuous wave half-wavelength potassium atom KD1 gas unit 2-2-1.

The DFB semiconductor continuous wave wavelength reference acetylene unit 2-1-1 includes: a fifth distributing feedback laser diode 2-1-1-1, configured to emit continuous wave laser; a seventh coupler 2-1-1-2, connected to the fifth distributing feedback laser diode 2-1-1-1, and configured to divide the continuous laser output by the fifth distributing feedback laser diode 2-1-1-1 into two portions; a third electro-optical phase modulator 2-1-1-3, connected to the seventh coupler 2-1-1-2, and configured to perform phase modulation of laser transmitted by the seventh coupler 2-1-1-2; a first acetylene gas absorption cell 2-1-1-4, connected to the third electro-optical phase modulator 2-1-1-3, and configured to make an intensity of the phase-modulated laser absorbed by the linear absorption of acetylene gas molecules P23; a third InGaAs-PIN detector 2-1-1-5, connected to the first acetylene gas absorption cell 2-1-1-4, and configured to detect laser remained after passing through the first acetylene gas absorption cell 2-1-1-4; a third transimpedance amplifier 2-1-1-6, connected to the third InGaAs-PIN detector 2-1-1-5, and configured to amplify a radio frequency signal detected by the third InGaAs-PIN detector 2-1-1-5; a third modulation radio frequency generator 2-1-1-13, configured to generate a modulated radio frequency signal; a third power divider 2-1-1-14, connected to the third modulation radio frequency generator 2-1-1-13, the third electro-optical phase modulator 2-1-1-3, and a third phase shifter 2-1-1-15, and configured to transmit a modulated radio frequency signal generated by the third modulated radio frequency generator 2-1-1-13 to the third electro-optical phase modulator 2-1-1-3 and the third phase shifter 2-1-1-15, respectively; a third mixer 2-1-1-7, connected to the third transimpedance amplifier 2-1-1-6 and the third phase shifter 2-1-1-15, and configured to mix a radio frequency signal amplified by the third transimpedance amplifier 2-1-1-6 with a modulated signal passed through the third phase shifter 2-1-1-15; a third low-pass filter 2-1-1-8, connected to the third mixer 2-1-1-7, and configured to filter the mixed radio frequency signal and output an analog signal of the feedback loop; a fifth analog-to-digital converter 2-1-1-9, connected to the third low-pass filter 2-1-1-8, and configured to convert an analog signal into a digital signal; a processor 2-1-1-10, connected to the fifth analog-to-digital converter 2-1-1-9, and configured to process the digital signal to obtain an error digital signal by calculation; a fifth digital-to-analog converter 2-1-1-11, connected to the processor 2-1-1-10, and configured to convert the error digital signal into a corresponding error analog signal; where the fifth analog-to-digital converter 2-1-1-9, the processor 2-1-1-10, and the fifth digital-to-analog converter 2-1-2-11 forming a servo unit to play a part of functions of the processing device 8-2; and a fifth current driver and temperature controller 2-1-1-12, connected to the fifth digital-to-analog converter 2-1-1-11 and configured to output a current increment and a temperature increment according to the error analog signal.

The fifth current driver and temperature controller 2-1-1-12 are also connected to the fifth distributing feedback laser diode 2-1-1-1, and configured to control an injection current and an operating temperature of the fifth distributing feedback laser diode 2-1-1-1.

Finally, an operating wavelength of the fifth distributing feedback laser diode 2-1-1-1 is locked at a center wavelength of the absorption line of the acetylene gas molecules P23.

The second DFB semiconductor continuous wave detection wavelength stabilization unit 2-1-2 includes: a sixth distributing feedback laser diode 2-1-2-1, configured to emit continuous wave laser; an eighth coupler 2-1-2-2, connected to the sixth distributing feedback laser diode 2-1-2-1, the third 1×1 switch 2-3, and a ninth coupler 2-1-2-3, and configured to transmit the laser output by the sixth distributing feedback laser diode 2-1-2-1 to the third 1×1 switch 2-3 and the ninth coupler 2-1-2-3, respectively; the ninth coupler 2-1-2-3, also connected to the seventh coupler 2-1-1-2, and configured to receive the laser of the fifth distributing feedback laser diode 2-1-1-1 transmitted by the seventh coupler 2-1-1-2; a third photodetector assembly 2-1-2-4, connected to the ninth coupler 2-1-2-3, and configured to perform heterodyne detection of a radio frequency signal of a difference frequency between two lasers of the ninth coupler 2-1-2-3; a third limiting amplifier 2-1-2-5, connected to the third photodetector assembly 2-1-2-4, and configured to limit and amplify the radio frequency signal; a first reference frequency synthesizer 2-1-2-7, configured to generate an 18 GHz UHF signal; a fourth mixer 2-1-2-6, connected to the third limiting amplifier 2-1-2-5 and the first reference frequency synthesizer 2-1-2-7, and configured to mix the limited and amplified radio frequency signal and the UHF signal to obtain a down-converted radio frequency signal; a fourth power divider 2-1-2-8, connected to the fourth mixer 2-1-2-6, and configured to divide the down-converted radio frequency signal into two portions, where, one portion of the down-converted radio frequency signal is directly transmitted to a first radio frequency power detector 2-1-2-11 for connection, and the other portion of the down-converted radio frequency signal is filtered by the fourth low-pass filter 2-1-2-9, and then transmitted to a second radio frequency power detector 2-1-2-10; a first radio frequency power detector 2-1-2-11, configured to detect a power numerical analog signal of the down-converted radio frequency signal; and a second radio frequency power detector 2-1-2-10, configured to detect an analog signal of a radio frequency power of the fourth low-pass filter; a sixth analog-to-digital converter 2-1-2-12, connected to the first radio frequency power detector 2-1-2-11 and the second radio frequency power detector 2-1-2-10, respectively, and configured to convert a power numerical analog signal into a numerical digital power signal; a processor 2-1-2-13, connected to the sixth analog-to-digital converter 2-1-2-12, and configured to calculate a ratio of two numerical digital power signals and obtain a transmittance of the down-converted radio frequency signal relative to the fourth low-pass filter 2-1-2-9, and perform calculation according to the numerical digital power signals to obtain an error digital signal; a sixth digital-to-analog converter 2-1-2-14, connected to the processor 2-1-2-13, and configured to convert the error digital signal into a corresponding error analog signal; where the sixth analog-to-digital converter 2-1-2-12, the processor 2-1-2-13, and the sixth digital-to-analog converter 2-1-2-14 form a servo unit to play a part of functions of the processing device 8-2; and a sixth current driver and temperature controller 2-1-2-15, connected to the sixth digital-to-analog converter, is configured to output a current increment and a temperature increment according to the error analog signal.

The sixth current driver and temperature controller 2-1-2-15, also connected to the sixth distributing feedback laser diode 2-1-2-1, is configured to control an injection current and an operating temperature of the sixth distributing feedback laser diode 2-1-2-1, such that an operating optical frequency of the sixth distributing feedback laser diode 2-1-2-1 is always 20.4 GHz higher than an operating optical frequency of the fifth distributing feedback laser diode 2-1-1-1.

Finally, an operating wavelength of the sixth distributing feedback laser diode 2-1-2-1 is stabilized at 1539.5916 nm.

A second DFB semiconductor continuous wave reference wavelength stabilization unit 2-2-1 includes: a seventh distributing feedback laser diode 2-2-1-1, configured to emit continuous wave laser; a tenth coupler 2-2-1-3, connected to the seventh distributing feedback laser diode 2-2-1-1 and the fourth 1×1 switch 2-4, and configured to transmit the laser output by the seventh distributing feedback laser diode 2-2-1-1 to the fourth 1×1 switch 2-4; a fourth modulation radio frequency generator 2-2-1-15, configured to generate a modulated radio frequency signal; a third frequency divider 2-2-1-16, connected to the fourth modulated radio frequency generator 2-2-1-15, and configured to divide the modulated radio frequency signal by two times; a fourth electro-optical phase modulator 2-2-1-4, connected to the tenth coupler 2-2-1-3 and the third frequency divider 2-2-1-16, and configured to modulate a phase of the laser output by the tenth coupler 2-2-1-3 according to the modulated radio frequency signal after frequency division; a third erbium-doped fiber amplifier 2-2-1-5, connected to the fourth electro-optic phase modulator 2-2-1-4, and configured to amplify a power of a phase modulated laser; a fourth frequency doubler 2-2-1-6, connected to the third erbium-doped fiber amplifier 2-2-1-5, and configured to halve a wavelength of laser after amplifying the power; a second potassium atom gas absorption cell 2-2-1-7, connected to the fourth frequency doubler 2-2-1-6, and configured to make the second potassium atom gas absorption cell 2-2-1-7 absorb a part of a double frequency continuous wave laser according to a linear KD1; a first silicon-PIN detector 2-2-1-8, connected to the second potassium atom gas absorption cell 2-2-1-7, and configured to detect laser remained after being absorbed by the potassium atom gas to obtain a radio frequency signal; a fourth phase shifter 2-2-1-17, connected to the fourth modulation radio frequency generator 2-2-1-15, and configured to perform a phase shift of the modulated radio frequency signal generated by the fourth modulated radio frequency generator 2-2-1-15 to obtain a modulated radio frequency signal after the phase shift; a fifth mixer 2-2-1-9, connected to the fourth phase shifter 2-2-1-17 and the first silicon-PIN detector 2-2-1-8, and configured to mix a radio frequency signal output by the silicon-PIN detector 2-2-1-8 with the phase-shifted modulated radio frequency signal; a fifth low-pass filter 2-2-1-10, connected to the fifth mixer 2-2-1-9, and configured to perform low-pass filtering the mixed signal to obtain an analog signal; a seventh analog-to-digital converter 2-2-1-11, connected to the fifth low-pass filter 2-2-1-10, and configured to convert the analog signal into a digital signal; a processor 2-2-1-12, connected to the seventh analog-to-digital converter 2-2-1-11, and configured to process the digital signal to obtain an error digital signal by calculation; a seventh digital-to-analog converter 2-2-1-13, connected to the processor 2-2-1-12, and configured to convert the error digital signal into a corresponding error analog signal; where a seventh analog-to-digital converter 2-2-1-11, the processor 2-2-1-12, and the seventh digital-to-analog converter 2-2-1-13 form a servo unit to play a part of functions of the processing device 8-2; and a seventh current driver and temperature controller 2-2-1-14, connected to the seventh digital-to-analog converter 2-2-1-13, and configured to output a current increment and a temperature increment according to the error analog signal.

The seventh current driver and temperature controller 2-2-1-14, also connected to the seventh distributing feedback laser diode 2-2-1-1, and configured to control an injection current and an operating temperature of the seventh distributing feedback laser diode 2-2-1-1.

Finally, an operating wavelength of the seventh distributing feedback laser diode 2-2-1-1 is stabilized at twice the wavelength of 770.1085 nm of a potassium atom gas absorption line.

The third transmitter 3 includes a 1650.994 nm detection laser seed source 3-1, a 1650.666 nm reference laser seed source 3-2, a fifth 1×1 switch 3-3, a sixth 1×1 switch 3-4, a third 2×1 switch 3-5, a first-stage Raman fiber amplifier 3-7, a second-stage Raman fiber amplifier 3-9, and a third frequency doubler 3-11 connected in sequence. The first-stage Raman fiber amplifier 3-7 is connected to a first pulse pump source 3-8. The second-stage Raman fiber amplifier 3-9 is connected to a second pulse pump source 3-10. The first pulse pump source 3-8 and the second pulse pump source 3-10 are connected to the pulse generator 8-3.

The 1650.994 nm detection laser seed source 3-1 includes a DFB semiconductor continuous wave wavelength reference methane unit 3-1-1 and a third DFB semiconductor continuous wave detection wavelength stabilization unit 3-1-2. The 1650.666 nm reference laser seed source 3-2 only includes a third DFB semiconductor continuous wave reference wavelength stabilization unit 3-2-1.

The DFB semiconductor continuous wave wavelength reference methane unit 3-1-1 includes: an eighth distributing feedback laser diode 3-1-1-1, configured to emit continuous wave laser; an eleventh coupler 3-1-1-2, connected to the eighth distributing feedback laser diode 3-1-1-1, and configured to divide the continuous laser output by the eighth distributing feedback laser diode 3-1-1-1 into two portions; an eighth distributing feedback laser diode 3-1-1-1, connected to the eleventh coupler 3-1-1-2, and configured to output laser; a fifth electro-optical phase modulator 3-1-1-3, connected to the eleventh coupler 3-1-1-2, and configured to modulate a phase of laser transmitted from the eleventh coupler 3-1-1-2; a first methane gas absorption cell 3-1-1-4, connected to the fifth electro-optical phase modulator 3-1-1-3 to make an intensity of the phase-modulated laser absorb according to a line shape of an absorption line of the methane gas molecules R4; a fourth InGaAs-PIN detector 3-1-1-5, connected to the first methane gas absorption cell 3-1-1-4, and configured to detect laser passing through the first methane gas absorption cell 3-1-1-4; a fourth transimpedance amplifier 3-1-1-6, connected to the fourth InGaAs-PIN detector 3-1-1-5, and configured to amplify a signal output by the fourth InGaAs-PIN detector 3-1-1-5; a fifth modulation radio frequency generator 3-1-1-13, configured to generate a modulated signal; a fifth power divider 3-1-1-14, connected to the fifth modulation radio frequency generator 3-1-1-13, the fifth electro-optical phase modulator 3-1-1-3, and a fifth phase shifter 3-1-1-15, and configured to transmit a modulated signal generated by the fifth modulation radio frequency generator 3-1-1-13 to the fifth electro-optic phase modulator 3-1-1-3 and the fifth phase shifter 3-1-1-15, respectively; a sixth mixer 3-1-1-7, connected to the fourth transimpedance amplifier 3-1-1-6 and the fifth phase shifter 3-1-1-15, and configured to mix a radio frequency signal output by the fourth transimpedance amplifier 3-1-1-6 with a modulated signal output by the fifth phase shifter 3-1-1-15; a sixth low-pass filter 3-1-1-8, connected to the sixth mixer 3-1-1-7, and configured to filter the mixed radio frequency signal and output an analog signal of the feedback loop; an eighth analog-to-digital converter 3-1-1-9, connected to the sixth low-pass filter 3-1-1-8, and configured to convert the analog signal output by the sixth low-pass filter 3-1-1-8 into a digital signal; a processor 3-1-1-10, connected to the eighth analog-to-digital converter 3-1-1-9, and configured to process the digital signal to obtain an error digital signal by calculation; an eighth digital-to-analog converter 3-1-1-11, connected to the processor 3-1-1-10, and configured to convert the error digital signal into a corresponding error analog signal; where the eighth analog-to-digital converter 3-1-1-9, the processor 3-1-1-10, and the eighth digital-to-analog converter 3-1-1-11 form a servo unit to play a part of functions of the processing device 8-2; and an eighth current driver and temperature controller 3-1-1-12, connected to the eighth digital-to-analog converter 3-1-1-11, and configured to output a current increment and a temperature increment according to the error analog signal.

The eighth current driver and temperature controller 3-1-1-12, also connected to the eighth distributing feedback laser diode 3-1-1-1 and configured to control an injection current and an operating temperature of the eighth distributing feedback laser diode 3-1-1-1.

Finally, an operating wavelength of the eighth distributing feedback laser diode 3-1-1-1 is locked at 1650.958 nm of a wavelength of an absorption line R4 of the methane gas molecules.

The third DFB semiconductor continuous wave detection wavelength stabilization unit 3-1-2 includes: a ninth distributing feedback laser diode 3-1-2-1, configured to emit continuous wave laser; a twelfth coupler 3-1-2-2, connected to the ninth distributing feedback laser diode 3-1-2-1, the fifth 1×1 switch 3-3, and a thirteenth coupler 3-1-2-3, and configured to transmit laser output by the ninth distributing feedback laser diode 3-1-2-1 to the fifth 1×1 switch 3-3 and the thirteenth coupler 3-1-2-3, respectively; the thirteenth coupler 3-1-2-3, also connected to the eleventh coupler 3-1-1-2, and configured to receive laser of the eighth distributing feedback laser diode 3-1-1-1 transmitted by the eleventh coupler 3-1-1-2; a fourth photodetector assembly 3-1-2-4, connected to the thirteenth coupler 3-1-2-3, and configured to perform heterodyne detection of a radio frequency signal of a difference frequency between two lasers of the thirteenth coupler 3-1-2-3; a fourth limiting amplifier 3-1-2-5, connected to the fourth photodetector assembly 3-1-2-4 and configured to limit and amplify the radio frequency signal; a fourth frequency divider 3-1-2-6, connected to the fourth limiting amplifier 3-1-2-5, and configured to divide a frequency of the limited and amplified radio frequency signal by 32 times; a third reference radio frequency generator 3-1-2-7, configured to generate a 123.8 MHz reference radio frequency signal; a seventh mixer 3-1-2-8, connected to the third reference radio frequency generator 3-1-2-7 and the first frequency divider 3-1-2-6, and configured to mix a reference radio frequency signal with the radio frequency signal after frequency division by 32 times to obtain a down-converted signal; a seventh low-pass filter 3-1-2-9, connected to the seventh mixer 3-1-2-8, and configured to filter the down-converted signal to obtain a low-frequency analog signal; a ninth analog-to-digital converter 3-1-2-10, connected to the seventh low-pass filter 3-1-2-9 and configured to convert the low-frequency analog signal into a low-frequency digital signal; a processor 3-1-2-11, connected to the ninth analog-to-digital converter 3-1-2-10, and configured to perform Fourier transform on the low-frequency digital signal to obtain a frequency of a low-frequency signal after the seventh low-pass filter 3-1-2-9, and perform calculation to obtain an error digital signal based on the frequency; a ninth digital-to-analog converter 3-1-2-12, connected to the processor 3-1-2-11, and configured to convert the error digital signal into a corresponding error analog signal; where the ninth analog-to-digital converter 3-1-2-9, the processor 3-1-2-10, and the ninth digital-to-analog converter 3-1-2-11 form a servo unit to plays a part of functions of the processing device 8-2; and a ninth current driver and temperature controller 3-1-2-13, connected to the ninth digital-to-analog converter, and configured to output a current increment and a temperature increment according to the error analog signal.

The ninth current driver and temperature controller 3-1-2-13 is also connected to the ninth distributing feedback laser diode 3-1-2-1, and configured to control an injection current and an operating temperature of the ninth distributing feedback laser diode, such that an operating wavelength of the nine distributing feedback laser diode 3-1-2-1 is always 36 pm longer than an operating wavelength of the eighth distributing feedback laser diode 3-1-1-1.

Finally, an operating wavelength of the ninth distributing feedback laser diode 3-1-2-1 is stabilized at 1650.994 nm.

The third DFB semiconductor continuous wave reference wavelength stabilization unit 3-2-1 includes: a tenth distributing feedback laser diode 3-2-1-1, configured to emit continuous laser; where the tenth distributing feedback laser diode 3-2-1-1 is also connected to the sixth 1×1 switch 3-4; a tenth current driver and temperature controller 3-2-1-2, connected to the tenth distributing feedback laser diode 3-2-1-1, and configured to control an injection current and an operating temperature of the tenth distributing feedback laser diode 3-2-1-1; where, an operating wavelength of the tenth distributing feedback laser diode 3-2-1-1 is passively stabilized at 1650.666 nm.

In this embodiment, the optical path transmission module 4 includes: a total reflection mirror 4-1, arranged in a transmission direction of laser output by the first transmitter 1, and configured to bend laser of the first transmitter 1 by 90°; a polarization beam combiner 4-2, arranged at an intersection of an optical path of the second transmitter 2 and an optical path of the total reflection mirror 4-1, and configured to combine laser of the first transmitter 1 with laser of the second transmitter 2; a first dichroic plate 4-3, arranged at an intersection of an optical path of the third transmitter 3 and an optical path of the polarization beam combiner 4-2, and configured to combine laser of the first transmitter 1, laser of the second transmitter 2, and laser of the third transmitter 3; and a beam expander 4-4, a shaft cone 4-5, a first lens 4-6, a telescope 4-8 and an input/output light window 4-9 arranged in sequence on an optical transmission path of a laser beam combination; where, after the laser beam combination is collimated, converted into an annular light spot, converged and processed in parallel, a parallel laser beam containing lasers with wavelengths of 765 nm, 770 nm and 825.5 nm enters the atmosphere, and is excited to produce an atmospheric backscattered echo light beam. The backscattered echo light beam passes through the input/output light window 4-9, and returns to the first lens 4-6 for parallel processing, and then is processed by a hollow reflection mirror 4-10, a second dichroic plate 4-11 and a small-angle interference filter 4-12 in sequence.

The second dichroic plate 4-11 separates out an 825.5 nm water vapor echo light from the parallel echo light beam and transmits it to the water vapor channel detection module 5.

The small-angle interference filter 4-12 separates out a 765 nm pressure echo light from the parallel echo light beam and transmits it to the pressure channel detection module 6, and transmits a 770 nm temperature echo light to the temperature channel detection module 7.

The hollow reflection mirror 4-10 is provided with a hollow portion and an outer peripheral reflection mirror. The hollow portion is configured to allow a light beam of an annular light spot sent by the shaft cone 4-5 to pass without any obstruction, and the outer peripheral reflection mirror is configured to make the parallel echo light beam bent by 90°.

In order to accurately detect the number of the water vapor photons, the water vapor channel detection module 5 includes: a first filter assembly 5-1, arranged in a transmission direction of the water vapor echo light and configured to suppress an ambient light; a second lens 5-2, arranged in a transmission direction of light output by the first filter assembly 5-1; and a first single-photon counter 5-3, arranged in a transmission direction of light output by the second lens 5-2, and configured to detect the number of the water vapor photons in the water vapor echo light.

In order to accurately detect the number of the pressure photons, the pressure channel detection module 6 includes: a second filter assembly 6-1, arranged on an optical path of the pressure echo light and configured to suppress the ambient light; a third lens 6-2, arranged in a transmission direction of light output by the second filter assembly 6-1; and a second single-photon counter 6-3, arranged in a transmission direction of light output by the third lens 6-2, and configured to detect the number of the pressure photons in the pressure echo light.

In order to accurately detect the number of the first temperature photons and the number of the second temperature photons, the temperature channel detection module 7 includes: a third filter assembly 7-1, arranged on an optical path of the temperature echo light and configured to suppress the ambient light; a 70/30 beam splitter 7-2, arranged in a transmission direction of light output by the third filter assembly 7-1, and dividing the temperature echo light into a 30% temperature echo light and a 70% temperature echo light; a fourth lens 7-3, arranged in a transmission direction of the 30% temperature echo light; a third single-photon counter 7-4, arranged in a transmission direction of light output by the fourth lens 7-3, and configured to detect the number of the first temperature photons in the 30% temperature echo light; a first potassium atom gas absorption cell 7-5, arranged in a transmission direction of the 70% temperature echo light; a fifth lens 7-6, arranged in a transmission direction of light output from the first potassium atom gas absorption cell 7-5; and a fourth single-photon counter 7-7, arranged in a transmission direction of light output by the fifth lens 7-6, and configured to detect the number of the second temperature photons in the 70% temperature echo light.

Embodiment 2

In this embodiment, the present disclosure also provides a method for detecting water vapor, temperature, and pressure of the atmosphere with a micro-pulse LiDAR, specifically including:

S1: emitting lasers of different wavelengths utilizing a first transmitter 1, a second transmitter 2, and a third transmitter 3, respectively, and combining the lasers of the different wavelengths into one laser beam;

S11: emitting laser to a total reflection mirror 4-1 via the first transmitter 1, and then deflecting the laser to a polarization beam combiner 4-2 via the total reflection mirror 4-1; where, the step of emitting the laser via the first transmitter 1 specifically includes: emitting continuous laser to a first 1×1 switch 1-3 and a second 1×1 switch 1-4 utilizing a 1530.3324 nm detection laser seed source 1-1 and a 1530.7608 nm reference laser seed source 1-2, respectively, and strobing the two continuous lasers to a first acousto-optic modulator 1-7 via a first 2×1 switch 1-5, and chopping the continuous laser into a pulsed laser via a first radio frequency oscillator 1-8; and amplifying the pulse energy utilizing a first erbium-doped fiber amplifier 1-9 and then outputting a 765 nm pulsed laser via a first frequency doubler;

S12: emitting laser to the polarization beam combiner 4-2 via the second transmitter 2, to perpendicularly intersect with and be combined with laser emitted by the first transmitter 1 into a laser beam, and deflecting the laser beam to a first dichroic plate 4-3; where, the step of emitting the laser with the transmitter 2 specifically includes: emitting the continuous laser to a third 1×1 switch 2-3 and a fourth 1×1 switch 2-4 utilizing a 1539.5916 nm detection laser seed source 2-1 and a 1540.2170 nm reference laser seed source 2-2, respectively, strobing the two continuous lasers to a second acousto-optic modulator 2-7 via a second 2×1 switch 2-5, and chopping the continuous laser into a pulsed laser via a second radio frequency oscillator 2-8; and amplifying a pulse energy via a second erbium-doped fiber amplifier 2-9, and then outputting a 770 nm pulsed laser via a second frequency doubler;

S13: emitting laser to the first dichroic plate 4-3 via the third transmitter 3, and combining the laser and a laser beam consisting of the laser emitted by the first transmitter 1 and the laser emitted by the second transmitter 2 into one beam; where, the step of emitting the laser with the third transmitter 3 specifically includes: emitting a continuous laser to a fifth 1×1 switch 3-3 and a sixth 1×1 switch 3-4 utilizing a 1650.994 nm detection laser seed source 3-1 and a 1650.666 nm reference laser seed source 3-2, respectively, strobing the two continuous lasers into a first Raman fiber amplifier via a third 2×1 switch 3-5, and chopping the continuous laser into a pulsed laser via a first pulse pump source 3-8; and amplifying a pulse energy via a second Raman fiber amplifier, and then outputting a pulsed laser of 825.5 nm via a third frequency doubler 3-11;

S2: guiding the laser beam to the atmosphere, and acquiring an excited atmospheric backscattered echo light beam;

S21: collimating the laser beam via a beam expander 4-4, and transforming the light beam into an annular light beam via a shaft cone 4-5;

S22: passing the annular light beam through a hollow portion of a hollow reflection mirror 4-10, and converging the annular light beam at a focal point of a telescope 4-8 with a lens;

S23: expanding a diameter of the annular light beam by a plurality of times via the telescope 4-8, and reducing a divergence angle of the annular light beam to obtain a parallel light beam;

S24: making the parallel light beam enter the atmosphere via an input/output light window 4-9, and receiving the excited atmospheric backscattered echo light beam of the parallel light beam via the input/output light window 4-9;

S3: converting the backscattered echo light beam into a parallel echo light beam, and separating the parallel echo light beam into a water vapor echo light, a pressure echo light, and a temperature echo light;

S31: collecting the echo light beam at the focal point of the telescope 4-8 via the telescope 4-8, and restoring the backscattered echo light beam to a parallel echo light beam via the lens;

S32: reflecting the parallel echo light beam to a second dichroic plate 4-11 via an outer peripheral mirror surface of the hollow reflection mirror 4-10;

S33: separating out the water vapor echo light from the parallel echo light beam via the second dichroic plate 4-11, and transmitting the remaining parallel echo light beam to a small-angle interference filter 4-12;

S34: separating out the pressure echo light via the small-angle interference filter 4-12 and obtaining the temperature echo light at the same time.

S4: detecting the water vapor echo light, the pressure echo light, and the temperature echo light respectively to obtain the number of the water vapor photons, the number of the pressure photons, the number of the first temperature photons, and the number of the second temperature photons;

S41: receiving and detecting the water vapor echo light via a water vapor channel detection module 5 to obtain the number of the water vapor photons;

S42: receiving and detecting the pressure echo light via a pressure channel detection module 6 to obtain the number of the pressure photons;

S43: receiving and detecting the temperature echo light via a temperature echo light detection module 7 to obtain the number of the first temperature photons and the number of the second temperature photons;

S5: transmitting the number of the water vapor photons, the number of the pressure photons, the number of the first temperature photons, and the number of the second temperature photons to the processing device 8-2 to perform unified inversion calculations to obtain the water vapor, the temperature, and the pressure of the atmosphere.

Embodiment 3

Figure 2:
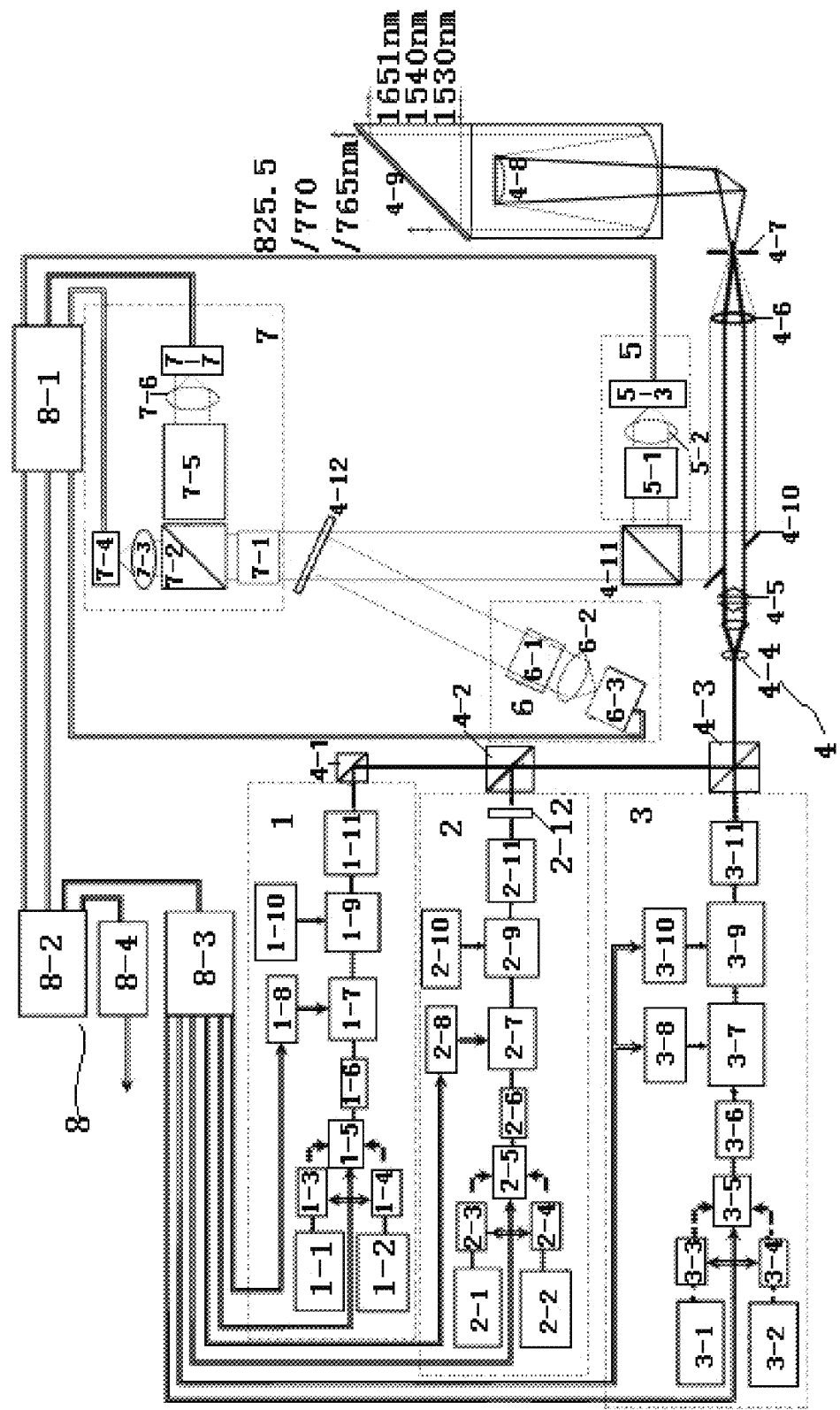
FIG. 2 is a structural diagram of a micro-pulse LiDAR according to the present disclosure.
Figure 3:
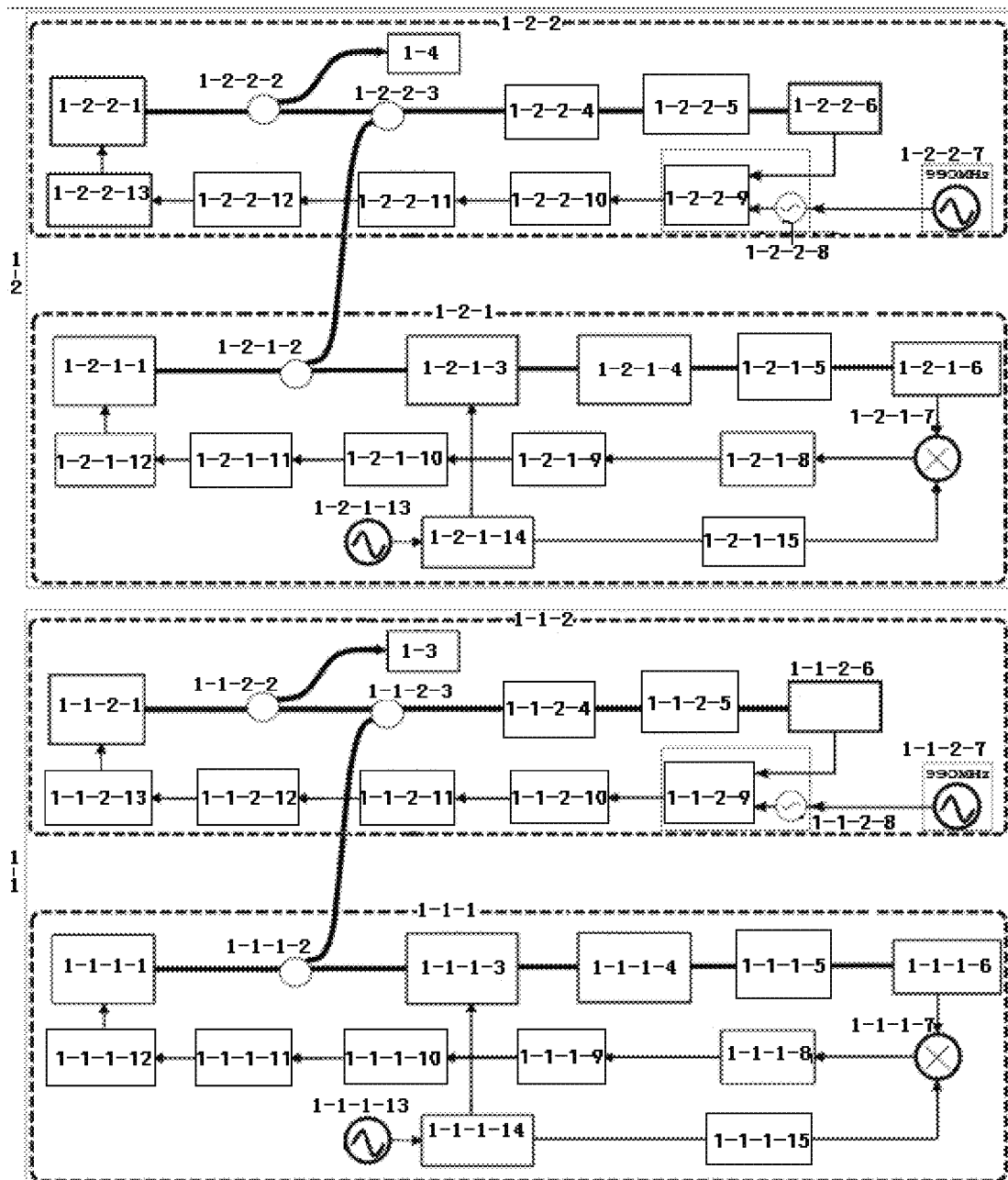
FIG. 3 is a structural diagram of a 1530 nm seed laser source according to the present disclosure.
Figure 4:
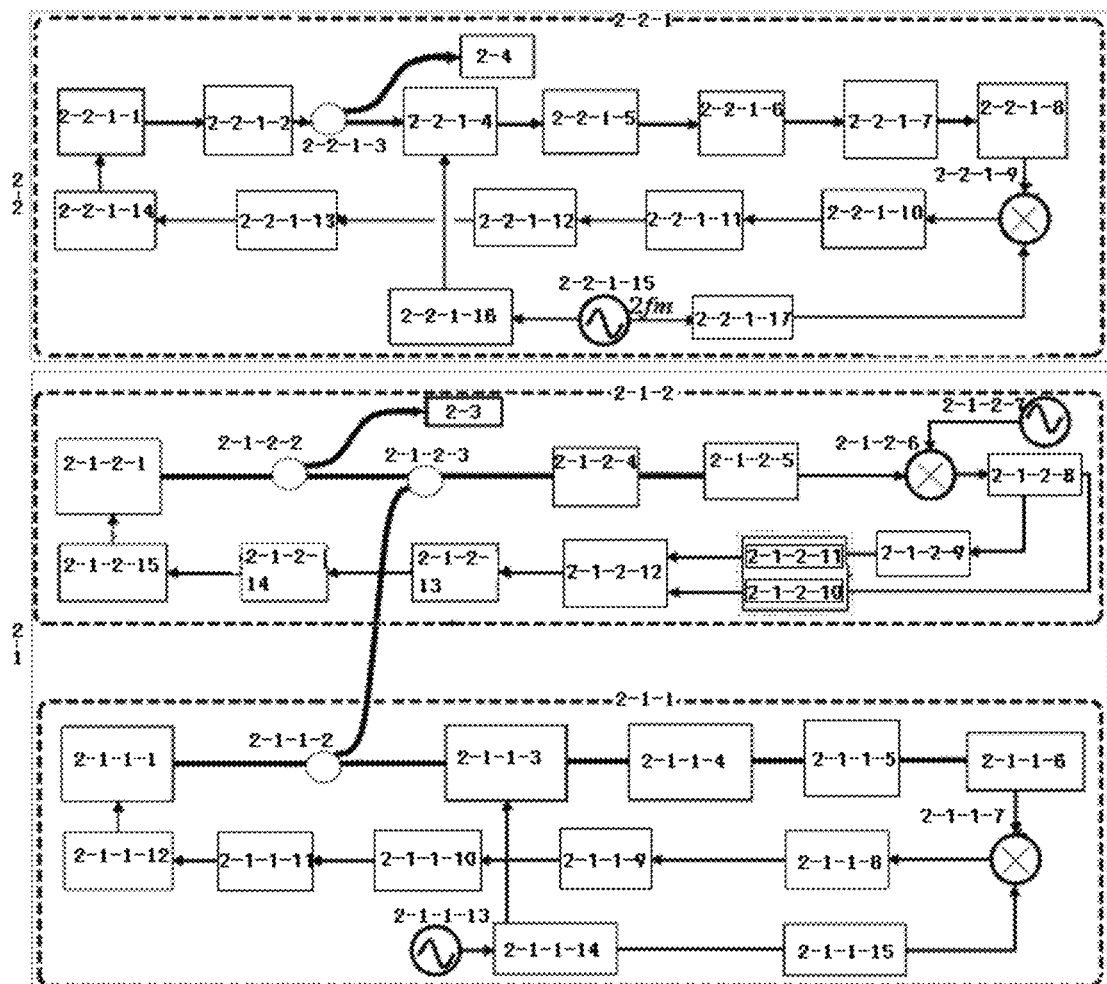
FIG. 4 is a structural diagram of a 1540 nm seed laser source according to the present disclosure.
Figure 5:
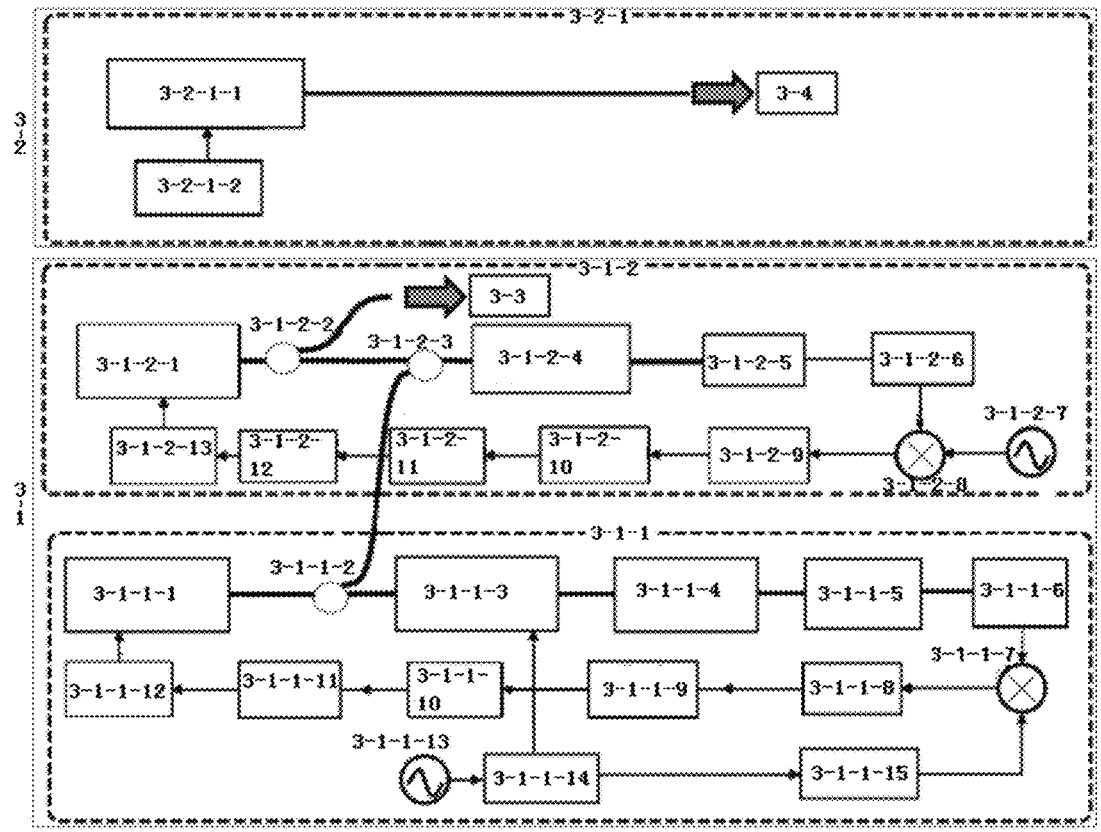
FIG. 5 is a structural diagram of a 1651 nm seed laser source according to the present disclosure.

Referring to FIG. 2, components of a first transmitter 1 includes a 1530.3324 nm detection laser seed source 1-1, a 1530.7608 nm reference laser seed source 1-2, a first 2×1 switch 1-5, and a first optical isolator 1-6, a first acousto-optic modulator 1-7 and a first radio frequency oscillator 1-8 thereof, a first erbium-doped fiber amplifier 1-9 and a first continuous pump source 1-10 thereof, and a first frequency doubler 1-11. The 1530.3324 nm detection laser seed source 1-1 with a stable wavelength and the 1530.7608 nm reference laser seed source 1-2 with a stable wavelength emit continuous lasers, and are respectively connected to the first 2×1 switch 1-5. The first 2×1 switch 1-5 strobes the two continuous lasers, respectively, is connected to the first acousto-optic modulator 1-7 connected to the first radio frequency oscillator 1-8, which chops the continuous laser into a pulsed laser with a pulse width of 300 ns or less and a pulse repetition frequency of 10 kHz. Pulse energy of the pulsed laser is amplified by the first erbium-doped fiber amplifier 1-9 including the first continuous pump source 1-10. The pulse energy can reach an order of 80 µJ. The pulsed laser is frequency-doubled via the first frequency doubler 1-11. A wavelength of the frequency-doubled pulsed laser is equal to a certain detection wavelength (765.1662 nm) of an oxygen A band, or equal to a reference wavelength (765.3804 nm) of a differential absorption LiDAR of the oxygen A band. A 765 nm pulsed laser pair is finally output with a pulse width of 300 ns, a pulse repetition frequency of 10 kHz, and pulse energy of 40 µJ.

Referring to FIG. 2, components of a second transmitter 2 includes a 1539.5916 nm detection laser seed source 2-1, a 1540.2170 nm reference laser seed source 2-2, a second 2×1 switch 2-5, a second optical isolator 2-6, a second acousto-optic modulator 2-7 and a second radio frequency oscillator 2-8 thereof, a second erbium-doped fiber amplifier 2-9 and a second continuous pump source 2-10 thereof, and a second frequency doubler 2-11. The 1539.5916 nm detection laser seed source 2-1 with a stable wavelength and the 1540.2170 nm reference laser seed source 2-2 with a stable wavelength emit continuous lasers, and are connected to the second 2×1 switch 2-5. The second 2×1 switch 2-5 strobes the two continuous lasers, and is connected to the second acousto-optic modulator 2-7 including the second radio frequency oscillator 2-8, which chops the continuous laser into a pulsed laser with a pulse width of 300 ns or less and a pulse repetition frequency of 10 kHz. Pulse energy of the pulsed laser is amplified by the second erbium-doped fiber amplifier 2-9 connected to the second continuous pump source 2-10. The pulse energy can reach an order of 110 µJ. The pulsed laser is frequency-doubled via the second frequency doubler 2-11. A wavelength of the frequency-doubled pulsed laser is equal to a certain detection wavelength (769.7865 nm) of the oxygen A band or equal to a reference wavelength (770.1085 nm) of the differential absorption LiDAR of the oxygen A band. A 770 nm pulsed laser pair is finally output with a pulse width of 300 ns, a pulse repetition frequency of 10 kHz, and pulse energy of 50 µJ.

Referring to FIG. 2, components of a third transmitter 3 includes a 1650.994 nm detection laser seed source 3-1, a 1650.666 nm reference laser seed source 3-2, a third 2×1 switch 3-5, a third optical isolator 3-6, a first-stage Raman fiber amplifier 3-7, a second-stage Raman fiber amplifier 3-9, a first pulse pump source 3-8 of the first-stage Raman fiber amplifier 3-7, a second pulse pump source 3-10 of the second-stage Raman fiber amplifier 3-9, and a third frequency doubler 3-11. The 1650.994 nm detection laser seed source 3-1 with a stable wavelength and the 1650.666 nm reference laser seed source 3-2 with a stable wavelength emit continuous lasers, and are connected to the third 2×1 switch 3-5 respectively. The third 2×1 switch 3-5 strobes the two continuous lasers, and is connected to the first-level Raman fiber amplifier 3-7, respectively, which chops the continuous laser into a pulsed laser with a pulse width of 100 ns and a pulse repetition frequency of 7 kHz. Pulse energy of the pulsed laser is amplified by the second-stage Raman fiber amplifier 3-9. The pulse energy can reach an order of 14 µJ. The pulsed laser is frequency-doubled via the third frequency doubler 3-11. A wavelength of the frequency-doubled pulsed laser is equal to a certain detection wavelength (825.497 nm) of a water vapor absorption line or equal to a reference wavelength (825.333 nm) of a water vapor differential absorption LiDAR. An operating material of the third frequency doubler 3-11 is a periodically polarized quasi-phase matching frequency doubling crystal. The quasi-phase matching crystal is placed in a dry, constant-temperature box with both transparent ends. A conversion efficiency of a frequency doubler can generally be 40-50%. An 825.5 nm pulsed laser pair is finally output with a pulse width of 100 ns, a pulse repetition frequency of 7 kHz, and pulse energy of 7 µJ.

A 765 nm pulsed laser beam emitted by the first transmitter 1 is reflected by a 45° total reflection mirror 4-1 to be combined with a 770 nm pulsed laser beam emitted by the second transmitter 2 into a beam via a polarization beam combiner 4-2. The beam is then combined with an 825.5 nm pulsed laser beam emitted by the third transmitter 3 via the dichroic plate 4-3 to be collimated into a parallel light beam by a beam expander 4-4. The parallel light beam has a cross section of a circular light spot and is transformed into a parallel light beam with an annular cross section via a pair of cone prisms 4-5. The parallel light beam passes through a hollow portion of a 45° hollow reflection mirror 4-10, and is then converged on a focal point 4-7 of a telescope 4-8 by a lens 4-6.

A pulsed laser from the focal point 4-7 enters the telescope 4-8. The light beam is expanded into a parallel light beam with a smaller divergence angle. A secondary mirror of the telescope 4-8 does not cause light beam loss by blocking the parallel light beam. The parallel light beam from the telescope 4-8 passes through an input/output light windows 4-9 into the atmosphere.

An echo light beam backscattered by a lower tropospheric atmosphere passes through the input/output light window 4-9 again, and is converged at the focal point 4-7 by the telescope 4-8. A light beam from the focal point 4-7 is restored to the parallel light beam by the lens 4-6. A diameter of the parallel echo light beam is larger than that of the emitted light beam, so that after the echo light beam is reflected by an outer peripheral mirror surface of the 45° hollow reflection mirror 4-10, a direction of the light beam is deflected by 90°. The echo parallel light is divided into two branches via a dichroic plate 4-11. One branch of 825.5 nm water vapor echo light enters a water vapor channel detection module 5, and the remaining one passes through the dichroic plate 4-11, and is divided into two paths via an interference filter 4-12 with an incident angle of less than 22.5°. One path of 770 nm temperature echo light passes through a small-angle interference filter 4-12 and then enters a temperature channel detection module 7, and the other path of 765 nm pressure echo light is fully reflected by the small-angle interference filter 4-12 and then enters a pressure channel detection module 6.

Figure 7:
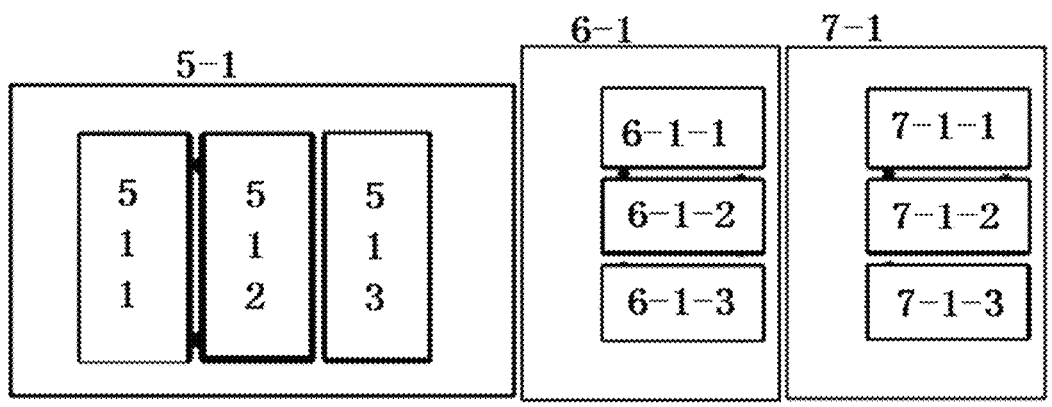
FIG. 7 is a structural diagram of filter combinations 5-1, 6-1, and 7-1.

Referring to FIG. 2, an 825.5 nm water vapor echo light passes through a first filter assembly 5-1 to suppress an ambient light, passes through a second lens 5-2, and is detected by a first single-photon counting module (SPCM) 5-3. Detected photons data is received by an input terminal of a multi-channel accumulator 8-1. In FIG. 7, the first filter assembly 5-1 includes a 12 nm broadband filter 5-1-1, an etalon 5-1-2, and a 750 pm dual-cavity narrowband filter 5-1-3. A free spectral range design of the etalon 5-1-2 makes 825.497 nm and 825.333 nm be two adjacent modes of the etalon 5-1-2, which can both pass through the etalon 5-1-2. A spectral curve of the dual-cavity narrowband filter 5-1-3 has a flat top, and is equivalent to transmittances of 825.497 nm and 825.333 nm.

Referring to FIG. 2, a 765 nm pressure echo light passes through a second filter assembly 6-1 and a third lens 6-2, and is detected by a second single-photon counter 6-3. The detected result is sent to the multi-channel accumulator 8-1. In FIG. 7, the second filter assembly 6-1 includes a 12 nm broadband filter 6-1-1, an etalon 6-1-2, and a 750 pm dual-cavity narrowband filter 6-1-3. A free spectral range design of the etalon 6-1-2 makes 765.1662 nm and 765.3804 nm be two adjacent modes of the etalon 6-1-2, which can both pass through the etalon 6-1-2. A free spectral range of the etalon 6-1-2 is equal to a difference between online and offline wavelengths.

Referring to FIG. 2, the 770 nm temperature echo light is divided into two paths by a 70/30 beam splitter 7-2. 30% of the 770 nm temperature echo light passes through a fourth lens 7-3 and is detected by a third single-photon counter 7-4. Detected data is received by the input terminal of the multi-channel accumulator 8-1. 70% of the 770 nm temperature echo light first passes through a first potassium atomic gas absorption cell 7-5, and then is detected by a fourth single-photon counter 7-7 via a fifth lens 7-6. The detected result is sent to the multi-channel accumulator 8-1. In FIG. 7, a third filter assembly 7-1 includes a 12 nm broadband filter 7-1-1, an etalon 7-1-2, and a 750 pm dual-cavity narrowband filter 7-1-3. A free spectral range design of the etalon 7-1-2 makes 769.7958 nm and 770.1085 nm be two adjacent modes of the etalon 7-1-2, which can both pass through the etalon 7-1-2. The second transmitter of LiDAR, the temperature channel detection module 7, a processing device 8-2 and a pulse generator 8-3 together form a 769.7958 nm/770.1085 nm differential absorption LiDAR. A 770.1085 nm high spectral resolution LiDAR is added. A Mie backscattering spectrum width of a LiDAR echo is much smaller than a Rayleigh backscattering spectrum width. The first potassium atom gas absorption cell 7-5 is a Mie-Rayleigh spectrum analyzer of a high spectral resolution LiDAR, where 30% of channels are Mie-Rayleigh channels, that is, the number $N_{30}$ of photons detected by 30% of the channels has both a Mie backscatter component and a Rayleigh backscattering component. 70% of the channels are Rayleigh channels, that is, the number $N_{70}$ of photons detected by 70% of the channels does not have the Mie backscattering component. The following equation can be expressed as:

$$\begin{cases} N_{30} = A_a S_a + A_m S_m, \\ N_{70} = B_m S_m, \end{cases} \quad (1)$$

Expressed by a matrix: $\begin{bmatrix} N_{30} \\ N_{70} \end{bmatrix} = \begin{pmatrix} A_a & A_m \\ 0 & B_m \end{pmatrix} \begin{bmatrix} S_a \\ S_m \end{bmatrix},$ (2)

Solution of the equation: $\begin{bmatrix} S_a \\ S_m \end{bmatrix} = \begin{pmatrix} A_a & A_m \\ 0 & B_m \end{pmatrix}^{-1} \begin{bmatrix} N_{30} \\ N_{70} \end{bmatrix}$ (3)

Where, $S_a$ represents all signals of Mie backscattering in 30% echo, $S_m$ represents all signals of Rayleigh backscattering in the 30% echo, $A_a$, $A_m$, and $B_m$ are all coefficients of a LiDAR system, which can be calibrated to obtain values thereof. After solving $S_a$ and $S_m$, a backscattering ratio of the atmosphere to the 770.1085 nm laser can be known in the following:

$$(\beta_m + \beta_a)/\beta_m = (S_a + S_m)/S_m \quad (4)$$

Because a wavelength of 769.7958 nm is very close to a wavelength of 770.1085 nm, it is considered that a backscattering ratio of 769.7958 nm is equal to a backscattering ratio of 770.1085 nm. The backscattering ratio of 769.7958 nm is very important for solving an absorption coefficient α of oxygen to 769.7958 nm laser. The absorption coefficient α appears in a temperature iterative calculation formula.

Figure 6:
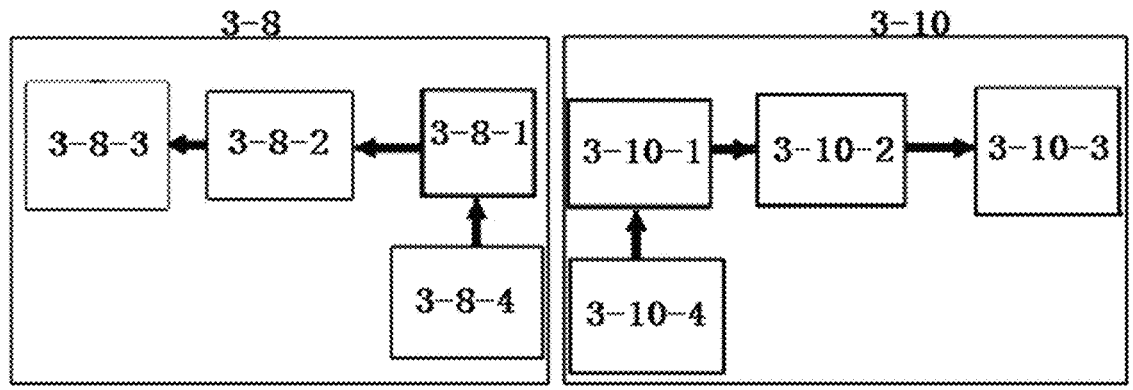
FIG. 6 is a structural diagram of a first pulse pump source 3-8 and a second pulse pump source 3-10.

As shown in FIG. 6, the first pulse pump source 3-8 of the first Raman fiber amplifier 3-7 includes an erbium-doped fiber amplifier 3-8-3, an SOA semiconductor optical amplifier 3-8-2, a frequency-sweep DBR laser diode 3-8-1, and a scanning current driver 3-8-4 of the DBR laser diode 3-8-1. An output current of the current driver 3-8-4 rises and falls in a triangle, a laser driving the DBR laser diode 3-8-1 constantly performs frequency sweep, with a pulse width of a driving current less than 200 ns, and a laser pulse of the DBR laser diode 3-8-1 changes an optical frequency around 1480 nm or 980 nm. A semiconductor optical amplifier 3-8-2 amplifies a pulsed laser of 1480 nm or 980 nm. The semiconductor optical amplifier 3-8-2 outputs a 1.55 μm pulsed laser via a pump erbium-doped fiber amplifier 3-8-3. The 1.55 μm pulsed laser excites the first Raman fiber amplifier 3-7. Under an injection of a 1651 nm continuous laser seed, a 1651 nm pulsed laser is emitted.

As shown in FIG. 6, the second pulse pump source 3-10 of the second-stage Raman fiber amplifier 3-9 is the same as the forgoing, which is not repeated. A single-frequency laser with a time width of 100 ns, a repetition frequency of 7 kHz and pulse energy of 14 μJ can be obtained via the two stages of Raman fiber amplifiers.

(1) In the inversion process of water vapor content, the most important relational formula is as follows:

$$n_{wv} = \frac{1}{2\Delta r(\sigma_{on}(r) - \sigma_{off}(r))} \ln\left(\frac{N_{on}(r)}{N_{on}(r+\Delta r)} \frac{N_{off}(r+\Delta r)}{N_{off}(r)}\right) \quad (5)$$

Where, $n_{wv}$ is molecular density of water vapor in the atmosphere, $\Delta r$ is a distance resolution unit, σ is an absorption cross section (subscripts are on and off, respectively) of an online and an offline wavelength of the water vapor, N is the number (subscripts are on and off, respectively) of water vapor photons of the online wavelength and the offline wavelength received by the water vapor channel detection module 5, and σ is a function of the atmospheric temperature and pressure at height r. Therefore, a prerequisite is provided for obtaining a vertical distribution profile of water vapor content: the vertical distribution of the atmospheric temperature and pressure is input into the inversion program as conditions.

(2) The iterative formula of the atmospheric temperature inversion is as follows:

$$T_{i+1}(z) = \frac{\frac{\varepsilon hc}{k_B}}{\ln\left\{\frac{k_B}{T_0}S_0\exp\left[\frac{\varepsilon hc}{k_B T_0}\right]q_{O_2}[1-q_{H_2O}]\Lambda(T_i(z))\right\} - \ln\left[\frac{\alpha T_i(z)^2}{P}\right]} \quad (6)$$

Where, $q_{O_2}$ is a mixing ratio of oxygen in the atmosphere, $q_{H_2O}$ is a mixing ratio of the water vapor in the atmosphere, P is the atmospheric pressure, and $T_{i+1}(z)$ and $T_i(z)$ are sequences of iterative calculations of an atmospheric temperature at a certain height. It can be seen if the atmospheric temperature needs to be calculated iteratively, the mixing ratio of the water vapor in the atmosphere and the atmospheric pressure are calculation conditions that need to be input. $k_B$ is a Boltzmann constant, $T_0$ is normal temperature, $S_0$ is an absorption coefficient peak, A is an absorption line shape, e represents an energy level, h is a Planck constant, and c is the light speed.

(3) The atmospheric pressure corresponds to a differential optical thickness of A-band dual wavelengths as follows:

$$P(r) - P(r_0) \propto 0.20948 \int_{r_0}^{r} \frac{n(z)}{1+q_{H_2O}(z)}\left(\sigma_{on}^{O_2}(z) - \sigma_{off}^{O_2}(z)\right)dz \quad (7)$$

Where, $q_{H_2O}(z)$ is a mixing ratio of the water vapor of the atmosphere at a height z, n(z) is molecular density of the atmosphere at the height z, $\sigma_{on}^{O_2}(z)$ and $\sigma_{off}^{O_2}(z)$ are absorption cross sections (subscripts are on and off, respectively) of oxygen molecule A band at an online wavelength and an offline wavelength at the height z, and the absorption cross section is a function of the atmospheric temperature at the height z. Therefore, to calculate the atmospheric pressure, an optical thickness dz needs to be calculated, while the calculation of the optical thickness requires priori values of the atmospheric temperature and the water vapor mixing ratio.

It can be seen from the forgoing that vertical profiles of the temperature, the water vapor, and the pressure of the atmosphere are coupled with each other. Therefore, when one of the parameters is inverted, values of the other two parameters can be used as input conditions to iteratively converge, which is an advantage of a compound detection of three parameters.

(4) When the 1540.2170 nm pulsed laser passes through a quasi-phase-matched second frequency doubler 2-11, half of energy is converted to a 770.1085 nm pulsed laser, and the remaining half of energy is 1540.2170 nm pulsed laser. The pulsed laser of 50 µJ, 10 kHz, and 300 ns is emitted into the atmosphere. A backscattered echo of the pulsed laser and a 1540.2170 nm continuous wave local oscillator laser (1% of power separated out from the second erbium-doped fiber amplifier 2-9 is used as a local oscillator), the radio frequency signal after a heterodyne detection and a signal of the second radio frequency oscillator 2-8 of the second acousto-optic modulator 2-7 are mixed and low-pass filtered. After that, A-D conversion, and fast Fourier transform (FFT) are performed on the signal, and wind speed information can be obtained based on Doppler principle. If an emission direction of a 1540.2170 nm pulsed laser can be rotated, a wind vector can be inverted.

Key core components (a DFB/DBR laser diode, an erbium-doped fiber amplifier, an acousto-optic modulator, an electro-optic modulator, a single-photon counting module SPCM) used in a micro-pulse LiDAR for a compound detection of the water vapor, the temperature, and the pressure of the lower tropospheric atmosphere are all well-developed devices in the field of low-light-level detection in an optical communications industry. The micro-pulse LiDAR for compound detection of the water vapor, the temperature, and the pressure of the lower tropospheric atmosphere significantly reduces costs, improves reliability and safety, and facilitates popularization and networked layout on the ground surface. The micro-pulse LiDAR will become a model of comprehensive use of an Internet of Things technology, artificial intelligence technology and big data technology in the near future, so that a method for measuring a vertical profile of meteorological parameters via a manual release of a radiosonde balloon will become a thing of the past.

The various embodiments in the specification are described in a progressive manner. Each embodiment focuses on the differences from other embodiments, and the same or similar parts between the various embodiments can be referred to each other. Specific examples are used in the present disclosure to describe the principles and implementation of the present disclosure. The description of the forgoing embodiments is only used to help understand the method and core idea of the present disclosure. In addition, there are changes in the specific implementation and scope of application for the person skilled in the art according to the present disclosure. In summary, the content of this specification should not be construed as limiting the present disclosure.

What is claimed is:

1. A micro-pulse LiDAR, comprising:
    a first transmitter, a second transmitter, and a third transmitter configured to emit lasers of different wavelengths, respectively;
    an optical path transmission module, arranged on optical transmission paths of the lasers of the different wavelengths, configured to combine the lasers of the different wavelengths into one laser beam and guide the beam into an atmosphere, and further configured to receive a backscattered echo light beam scattered by the atmosphere, convert the backscattered echo light beam into a parallel echo light beam, and separate the parallel echo light beam into a water vapor echo light, a pressure echo light and a temperature echo light to emit respectively;
    a water vapor channel detection module, a pressure channel detection module, and a temperature channel detection module that are arranged on transmission light paths of the water vapor echo light, the pressure echo light, and the temperature echo light, respectively; wherein the water vapor channel detection module is configured to receive and detect a number of first photons in the water vapor echo light; the pressure channel detection module is configured to receive and detect a number of second photons in the pressure echo light; and the temperature channel detection module is configured to receive and detect a number of third photons and a number of fourth photons in the temperature echo light; and a data processing control module, connected to the first transmitter, the second transmitter, the third transmitter, the water vapor channel detection module, the pressure channel detection module, and the temperature channel detection module, configured to acquire data of the water vapor channel detection module, the pressure channel detection module, and the temperature channel detection module, and unify the data for inversion calculations, and configured to control injection currents and operating temperatures of the first transmitter, the second transmitter, and the third transmitter, and chop output continuous-wave lasers with different wavelengths from laser seed sources in the first transmitter, the second transmitter, and the third transmitter into pulsed lasers as the lasers of different wavelengths emitted, to coordinate timing of the micro-pulse LIDAR; wherein the data processing control module comprises:

a multi-channel data accumulator, where, an input terminal of the multi-channel data accumulator is connected to the water vapor channel detection module, the pressure channel detection module, and the temperature channel detection module, respectively, and an output terminal of the multi-channel data accumulator is connected to a processing device, the multi-channel data accumulator is configured to transmit the number of the first photons, the number of the second photons, the number of the third photons, and the number of the fourth photons to the processing device for unified inversion calculations;

wherein the processing device is further connected to
a pulse generator, which is connected to the first transmitter, the second transmitter, and the third transmitter, respectively, and provides the first transmitter, the second transmitter, and the third transmitter with chopped pulses; and the processing device comprises at least one processor connected to the first transmitter, the second transmitter, and the third transmitter, and configured to form a servo unit to adjust the injection currents and the operating temperatures of the first transmitter, the second transmitter, and the third transmitter, the processing device is also configured to coordinate timing of the pulse generator and the data accumulator;

wherein the optical path transmission module further comprises:

a total reflection mirror, arranged in a transmission direction of light output by the first transmitter, and configured to deflect the laser of the first transmitter by 90°;

a polarization beam combiner, arranged at an intersection of a transmission direction of light output by the second transmitter and a transmission direction of light output by the total reflection mirror, and configured to perform cross-polarization combination on the laser of the first transmitter and the laser of the second transmitter;

a first dichroic plate, arranged at an intersection of an optical path of the third transmitter and an optical path of the polarization beam combiner, and configured to combine the laser of the first transmitter, the laser of the second transmitter, and the laser of the third transmitter; and a beam expander, a shaft cone, a first lens, a telescope and an input/output light window arranged in sequence on an optical transmission path of the combined laser beam;

wherein after the combined laser beam is collimated, converted into an angular light spot, converged, and parallelized in sequence, a parallel laser beam containing lasers with 765 nm, 770 nm and 825.5 nm wavelengths enters the atmosphere, and is scattered by the atmosphere to produce a backscattered echo light beam, and then the backscattered echo light beam returns to the first lens through the input/output light window for parallel processing, and further processed by a hollow reflection mirror, a second dichroic plate and a small-angle interference filter in sequence;

wherein the second dichroic plate separates out an 825.5 nm water vapor echo light from the parallel echo light beam and transmits the 825.5 nm water vapor echo light to the water vapor channel detection module; and the small-angle interference filter separates out a 765 nm pressure echo light from the parallel echo light beam and transmits the 765 nm pressure echo light to the pressure channel detection module, and transmits a 770 nm temperature echo light to the temperature channel detection module.

2. The micro-pulse LiDAR according to claim 1, wherein the hollow reflection mirror is provided with a hollow portion and an outer peripheral reflection mirror, the hollow portion is configured to allow a light beam of an annular light spot sent by the shaft cone to pass through without obstruction, and the outer peripheral reflection mirror is configured to make the parallel echo light beam deflected by 90°.

3. A method for detecting water vapor, temperature, and pressure of an atmosphere utilizing the micro-pulse LiDAR according to claim 1, further comprising:

emitting lasers of different wavelengths, by a first transmitter, a second transmitter, and a third transmitter, respectively, and combining the lasers of the different wavelengths into a laser beam;

guiding the laser beam to an atmosphere, and acquiring a backscattered echo light beam scattered by the atmosphere;

converting the backscattered echo light beam into a parallel echo light beam, and separating the parallel echo light beam into a water vapor echo light, a pressure echo light, and a temperature echo light;

detecting the water vapor echo light, the pressure echo light, and the temperature echo light respectively to obtain a number of first photons, a number of second photons, a number of third photons, and a number of fourth photons; and transmitting the number of the first photons, the number of the second photons, the number of the third photons, and the number of the fourth photons to the processing device to perform unified inversion calculations to obtain the water vapor, the temperature, and the pressure of the atmosphere.

4. The method for detecting the water vapor, the temperature, and the pressure of the atmosphere according to claim 3, wherein the steps of emitting the lasers of the different wavelengths by the first transmitter, the second transmitter, and the third transmitter respectively and combining the lasers of the different wavelengths into the laser beam, guiding the laser beam to the atmosphere, acquiring the backscattered echo light beam scattered by the atmosphere, converting the backscattered echo light beam into the parallel echo light beam, and separating the parallel echo light beam into the water vapor echo light, the pressure echo light, and the temperature echo light comprise:

emitting the laser to the total reflection mirror via the first transmitter, and then deflecting the laser to the polarization beam combiner via the total reflection mirror;

emitting the laser to the polarization beam combiner via the second transmitter to perpendicularly intersect with and be combined with the laser emitted by the first transmitter into a laser beam and deflecting the laser beam to the first dichroic plate;

emitting the laser to the first dichroic plate via the third transmitter, and combine the laser with the laser beam consisting of the laser of the first transmitter and the laser of the second transmitter into a laser beam;

collimating the laser beam via a beam expander, and transforming the light beam into an annular light beam via a shaft cone;

passing the annular light beam through a hollow portion of a hollow reflection mirror, and converging the annular light beam at a focal point of a telescope via a lens;

expanding a diameter of the annular light beam by a plurality of times via the telescope, and reducing a divergence angle of the annular light beam to obtain a parallel light beam;

making the parallel light beam enter the atmosphere via an input/output light window, and receiving the scattered atmospheric backscattered echo light beam of the parallel light beam via the input/output light window;

collecting the echo light at the focal point of the telescope via the telescope, and restoring the backscattered echo light beam to a parallel echo light beam via the lens;

reflecting the parallel echo light beam to a second dichroic plate via an outer peripheral mirror surface of the hollow reflection mirror;

separating out the water vapor echo light from the parallel echo light beam via the second dichroic plate, and transmitting a remaining parallel echo light beam to a small-angle interference filter; and separating out the pressure echo light via the small-angle interference filter and obtaining the temperature echo light at the same time.

5. The method for detecting the water vapor, the temperature, and the pressure of the atmosphere according to claim 4, wherein the step of detecting the water vapor echo light, the pressure echo light, and the temperature echo light respectively to obtain the number of the first photons, the number of the second photons, the number of the third photons, and the number of the fourth photons comprises:

receiving and detecting the water vapor echo light via the water vapor channel detection module to obtain the number of the first photons;

receiving and detecting the pressure echo light via the pressure channel detection module to obtain the number of the second photons;

receiving and detecting the temperature echo light via the temperature echo light detection module to obtain the number of third photons and the number of the fourth photons.

6. The micro-pulse LiDAR according to claim 1, wherein the water vapor channel detection module comprises:

a first filter assembly, arranged in a transmission direction of the water vapor echo light and configured to suppress an ambient light;

a second lens, arranged in a transmission direction of light output by the first filter assembly; and a first single-photon counter, arranged in a converging direction of light output by the second lens, and configured to detect the number of the first photons in the water vapor echo light.

7. A method for detecting water vapor, temperature, and pressure of an atmosphere utilizing the micro-pulse LiDAR according to claim 6, further comprising:

emitting lasers of different wavelengths, by a first transmitter, a second transmitter, and a third transmitter, respectively, and combining the lasers of the different wavelengths into a laser beam;

guiding the laser beam to an atmosphere, and acquiring a backscattered echo light beam scattered by the atmosphere;

converting the backscattered echo light beam into a parallel echo light beam, and separating the parallel echo light beam into a water vapor echo light, a pressure echo light, and a temperature echo light;

detecting the water vapor echo light, the pressure echo light, and the temperature echo light respectively to obtain a number of first photons, a number of second photons, a number of third photons, and a number of fourth photons; and transmitting the number of the first photons, the number of the second photons, the number of the third photons, and the number of the fourth photons to the processing device to perform unified inversion calculations to obtain the water vapor, the temperature, and the pressure of the atmosphere.

8. The method for detecting the water vapor, the temperature, and the pressure of the atmosphere according to claim 7, wherein the steps of emitting the lasers of the different wavelengths by the first transmitter, the second transmitter, and the third transmitter respectively and combining the lasers of the different wavelengths into the laser beam, guiding the laser beam to the atmosphere, acquiring the backscattered echo light beam scattered by the atmosphere, converting the backscattered echo light beam into the parallel echo light beam, and separating the parallel echo light beam into the water vapor echo light, the pressure echo light, and the temperature echo light further comprises:

emitting the laser to the total reflection mirror via the first transmitter, and then deflecting the laser to the polarization beam combiner via the total reflection mirror;

emitting the laser to the polarization beam combiner via the second transmitter to perpendicularly intersect with and be combined with the laser emitted by the first transmitter into a laser beam and deflecting the laser beam to the first dichroic plate;

emitting the laser to the first dichroic plate via the third transmitter, and combine the laser with the laser beam consisting of the laser of the first transmitter and the laser of the second transmitter into a laser beam;

collimating the laser beam via a beam expander, and transforming the light beam into an annular light beam via a shaft cone;

passing the annular light beam through a hollow portion of a hollow reflection mirror, and converging the annular light beam at a focal point of a telescope via a lens;

expanding a diameter of the annular light beam by a plurality of times via the telescope, and reducing a divergence angle of the annular light beam to obtain a parallel light beam;

making the parallel light beam enter the atmosphere via an input/output light window, and receiving the scattered atmospheric backscattered echo light beam of the parallel light beam via the input/output light window;

collecting the echo light at the focal point of the telescope via the telescope, and restoring the backscattered echo light beam to a parallel echo light beam via the lens;

reflecting the parallel echo light beam to a second dichroic plate via an outer peripheral mirror surface of the hollow reflection mirror;

separating out the water vapor echo light from the parallel echo light beam via the second dichroic plate, and transmitting a remaining parallel echo light beam to a small-angle interference filter; and separating out the pressure echo light via the small-angle interference filter and obtaining the temperature echo light at the same time.

9. The method for detecting the water vapor, the temperature, and the pressure of the atmosphere according to claim 8, wherein the step of detecting the water vapor echo light, the pressure echo light, and the temperature echo light respectively to obtain the number of the first photons, the number of the second photons, the number of the third photons, and the number of the fourth photons further comprises:

receiving and detecting the water vapor echo light via the water vapor channel detection module to obtain the number of the first photons;

receiving and detecting the pressure echo light via the pressure channel detection module to obtain the number of the second photons;

receiving and detecting the temperature echo light via the temperature echo light detection module to obtain the number of third photons and the number of the fourth photons.

10. The micro-pulse LiDAR according to claim 1, wherein the pressure channel detection module comprises:

a second filter assembly, arranged on a transmission direction of the pressure echo light and configured to suppress an ambient light;

a third lens, arranged in a transmission direction of light output by the second filter assembly; and a second single-photon counter, arranged in a converging direction of light output by the third lens, and configured to detect the number of the second photons in the pressure echo light.

11. A method for detecting water vapor, temperature, and pressure of an atmosphere utilizing the micro-pulse LiDAR according to claim 10, further comprising:

emitting lasers of different wavelengths, by a first transmitter, a second transmitter, and a third transmitter, respectively, and combining the lasers of the different wavelengths into a laser beam;

guiding the laser beam to an atmosphere, and acquiring a backscattered echo light beam scattered by the atmosphere;

converting the backscattered echo light beam into a parallel echo light beam, and separating the parallel echo light beam into a water vapor echo light, a pressure echo light, and a temperature echo light;

detecting the water vapor echo light, the pressure echo light, and the temperature echo light respectively to obtain a number of first photons, a number of second photons, a number of third photons, and a number of fourth photons; and transmitting the number of the first photons, the number of the second photons, the number of the third photons, and the number of the fourth photons to the processing device to perform unified inversion calculations to obtain the water vapor, the temperature, and the pressure of the atmosphere.

12. The micro-pulse LiDAR according to claim 1, wherein the temperature channel detection module comprises:

a third filter assembly, arranged on a transmission direction of the temperature echo light and configured to suppress an ambient light;

a 70/30 beam splitter, arranged in a transmission direction of light output by the third filter assembly, and dividing the temperature echo light into a 30% temperature echo light and a 70% temperature echo light;

a fourth lens, arranged in a transmission direction of the 30% temperature echo light;

a third single-photon counter, arranged in a converging direction of light output by the fourth lens, and configured to detect the number of the third photons in the 30% temperature echo light;

a first potassium atom gas absorption cell, arranged in a transmission direction of the 70% temperature echo light;

a fifth lens, arranged in a transmission direction of light output from the first potassium atom gas absorption cell; and a fourth single-photon counter, arranged in a converging direction of light output by the fifth lens, and configured to detect the number of the fourth photons in the 70% temperature echo light.

13. A method for detecting water vapor, temperature, and pressure of an atmosphere utilizing the micro-pulse LiDAR according to claim 12, further comprising:

emitting lasers of different wavelengths, by a first transmitter, a second transmitter, and a third transmitter, respectively, and combining the lasers of the different wavelengths into a laser beam;

guiding the laser beam to an atmosphere, and acquiring a backscattered echo light beam scattered by the atmosphere;

converting the backscattered echo light beam into a parallel echo light beam, and separating the parallel echo light beam into a water vapor echo light, a pressure echo light, and a temperature echo light;

detecting the water vapor echo light, the pressure echo light, and the temperature echo light respectively to obtain a number of first photons, a number of second photons, a number of third photons, and a number of fourth photons; and transmitting the number of the first photons, the number of the second photons, the number of the third photons, and the number of the fourth photons to the processing device to perform unified inversion calculations to obtain the water vapor, the temperature, and the pressure of the atmosphere.

14. A method for detecting water vapor, temperature, and pressure of an atmosphere utilizing the micro-pulse LiDAR according to claim 1, comprising:

emitting lasers of different wavelengths, by a first transmitter, a second transmitter, and a third transmitter, respectively, and combining the lasers of the different wavelengths into a laser beam;

guiding the laser beam to an atmosphere, and acquiring a backscattered echo light beam scattered by the atmosphere;

converting the backscattered echo light beam into a parallel echo light beam, and separating the parallel echo light beam into a water vapor echo light, a pressure echo light, and a temperature echo light;

detecting the water vapor echo light, the pressure echo light, and the temperature echo light respectively to obtain a number of first photons, a number of second photons, a number of third photons, and a number of fourth photons; and transmitting the number of the first photons, the number of the second photons, the number of the first temperature third photons, and the number of the fourth photons to the processing device to perform unified inversion calculations to obtain the water vapor, the temperature, and the pressure of the atmosphere.

15. The method for detecting the water vapor, the temperature, and the pressure of the atmosphere according to claim 14, wherein the steps of emitting the lasers of the different wavelengths by the first transmitter, the second transmitter, and the third transmitter respectively and combining the lasers of the different wavelengths into the laser beam, guiding the laser beam to the atmosphere, acquiring the backscattered echo light beam scattered by the atmosphere, converting the backscattered echo light beam into the parallel echo light beam, and separating the parallel echo light beam into the water vapor echo light, the pressure echo light, and the temperature echo light further comprises:

emitting the laser to the total reflection mirror via the first transmitter, and then deflecting the laser to the polarization beam combiner via the total reflection mirror;

emitting the laser to the polarization beam combiner via the second transmitter to perpendicularly intersect with and be combined with the laser emitted by the first transmitter into a laser beam and deflecting the laser beam to the first dichroic plate;

emitting the laser to the first dichroic plate via the third transmitter, and combine the laser with the laser beam consisting of the laser of the first transmitter and the laser of the second transmitter into a laser beam;

collimating the laser beam via a beam expander, and transforming the light beam into an annular light beam via a shaft cone;

passing the annular light beam through a hollow portion of a hollow reflection mirror, and converging the annular light beam at a focal point of a telescope via a lens;

expanding a diameter of the annular light beam by a plurality of times via the telescope, and reducing a divergence angle of the annular light beam to obtain a parallel light beam;

making the parallel light beam enter the atmosphere via an input/output light window, and receiving the scattered atmospheric backscattered echo light beam of the parallel light beam via the input/output light window;

collecting the echo light at the focal point of the telescope via the telescope, and restoring the backscattered echo light beam to a parallel echo light beam via the lens;

reflecting the parallel echo light beam to a second dichroic plate via an outer peripheral mirror surface of the hollow reflection mirror;

separating out the water vapor echo light from the parallel echo light beam via the second dichroic plate, and transmitting a remaining parallel echo light beam to a small-angle interference filter; and separating out the pressure echo light via the small-angle interference filter and obtaining the temperature echo light at the same time.

16. The method for detecting the water vapor, the temperature, and the pressure of the atmosphere according to claim 15, wherein the step of detecting the water vapor echo light, the pressure echo light, and the temperature echo light respectively to obtain the number of the first photons, the number of the second photons, the number of the third photons, and the number of the fourth photons further comprises:

receiving and detecting the water vapor echo light via the water vapor channel detection module to obtain the number of the first photons;

receiving and detecting the pressure echo light via the pressure channel detection module to obtain the number of the second photons;

receiving and detecting the temperature echo light via the temperature echo light detection module to obtain the number of third photons and the number of the fourth photons.

* * * * *